US006998086B2

(12) United States Patent
Lake et al.

(10) Patent No.: US 6,998,086 B2
(45) Date of Patent: Feb. 14, 2006

(54) MULTI-SEGMENTED EMBOSSING APPARATUS AND METHOD

(75) Inventors: Andrew Michael Lake, Kimberly, WI (US); Shelley Rae Rasmussen, Oshkosh, WI (US); Jesse James Pasterski, Greenville, WI (US); Wen Tong Lay, Appleton, WI (US); Marcus David Weiher, Sherwood, WI (US); Michael John Bott, Oshkosh, WI (US); Rodney Lawrence Abba, Oshkosh, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 264 days.

(21) Appl. No.: 10/666,367

(22) Filed: Sep. 19, 2003

(65) Prior Publication Data

US 2005/0064058 A1 Mar. 24, 2005

(51) Int. Cl.
*B29C 59/04* (2006.01)

(52) U.S. Cl. ............................ 264/284; 101/6; 101/23; 101/32; 425/194; 425/363

(58) Field of Classification Search ................ 425/194, 425/363, 385, 471; 264/284; 101/6, 23, 101/32
See application file for complete search history.

(56) References Cited

U.S. PATENT DOCUMENTS 1,357,141 A * 10/1920 Bibb .......................... 425/194
3,874,836 A * 4/1975 Johnson et al. ............. 425/363
3,881,490 A 5/1975 Whitehead et al.
4,159,677 A * 7/1979 Smith .......................... 101/23
4,289,725 A 9/1981 Muller et al.
5,173,313 A * 12/1992 Sato et al. .................. 425/194
5,211,641 A 5/1993 Roos et al.
5,858,515 A 1/1999 Stokes et al.
5,891,118 A 4/1999 Toyoshima et al.

(Continued)

FOREIGN PATENT DOCUMENTS

EP 1 321 286 A1 6/2003

(Continued)

*Primary Examiner*—James P. Mackey
(74) *Attorney, Agent, or Firm*—Paul Yee

(57) ABSTRACT

An embossing method and apparatus (20) comprises a rotary embossing device (32) having a radial direction (28) and an outer peripheral surface (34). The embossing device (32) includes at least one embossing-component (48) which extends at least radially outward from the peripheral surface (34), and is configured to provide for a first embossing-pattern (38). The embossing device (32) also includes a rotary shaft member (46). A base embossing-segment (50) is operatively joined to the rotary shaft member (46) and configured to carry a first base-section (40) of the first embossing-component (48). In a particular aspect, a first, supplemental embossing-segment (52) is operatively joined and selectively positionable on the rotary shaft member (46), and is configured to carry a first supplemental-section (42) of the first embossing-component (48). In other aspects, a first spacing mechanism (56) can adjust a radial position of the first, supplemental embossing-segment (52), and a first, supplemental attachment-mechanism (60) can secure the radial position of the second supplemental embossing-segment (52).

20 Claims, 15 Drawing Sheets

U.S. PATENT DOCUMENTS

| | | | |
|---|---|---|---|
| 5,925,026 A | 7/1999 | Arteman et al. | |
| 6,170,393 B1 | 1/2001 | Hook et al. | |
| 6,251,207 B1 | 6/2001 | Schultz et al. | |
| 6,716,017 B2 * | 4/2004 | Papadopoulas | 425/194 |
| 2001/0007065 A1 | 7/2001 | Blanchard et al. | |
| 2002/0017354 A1 | 2/2002 | Riddell | |
| 2002/0197346 A1 | 12/2002 | Papadopoulos | |
| 2004/0176734 A1 | 9/2004 | Rasmussen et al. | |
| 2005/0035492 A1 | 2/2005 | Weiher et al. | |
| 2005/0064058 A1 | 3/2005 | Lake et al. | |

FOREIGN PATENT DOCUMENTS

| | | |
|---|---|---|
| GB | 2 370 780 A | 7/2002 |
| WO | WO 90/05514 A1 | 5/1990 |
| WO | WO 95/07674 A | 3/1995 |
| WO | WO 97/20107 A1 | 6/1997 |
| WO | WO 97/48551 A1 | 12/1997 |
| WO | WO 98/51250 A | 11/1998 |

* cited by examiner

MULTI-SEGMENTED EMBOSSING APPARATUS AND METHOD

FIELD OF THE INVENTION

The present invention relates to an embossing system. More particularly, the present invention pertains to a rotary system for forming an embossed article.

BACKGROUND OF THE INVENTION

Conventional rotary embossing systems have been employed to emboss article webs, and the embossed webs have been employed to produce personal care absorbent articles. Typical embossing systems have included rotary embossing rolls and cooperating, rotary anvil rolls. The embossing rolls have been configured to provide an array of embossing dies to provide embossing lines arranged with selected shapes. Other conventional embossing systems have also included bonding components for providing construction bonds. In particular systems, the construction bonds have been located proximate the regions of article web where the article web has been embossed. Typically, the operating speed of the embossing system has been limited by the available embossing force and by the amount of dwell time needed to reliably form the desired embossments. With conventional systems, the embossing operation has typically been performed prior to a cutting operation that separates the article web into individual articles.

To maintain the integrity of the article web, the operating speed of conventional embossing systems has been limited. High-speed embossing operations have required high levels of embossing force, and the high embossing force has caused an undesired cutting or breaking of one or more component layers of the article web. In addition, the high speed embossing operation has made it difficult to provide sufficient levels of dwell time during which the embossing can be conducted. The low dwell time has excessively reduced the reliability of the embossing operation. As a result, there has been a continued need for a high speed embossing method and apparatus that can more efficiently and more reliably form desired embossments while substantially avoiding any excessive cutting or breakage of the article web.

BRIEF DESCRIPTION OF THE INVENTION

Generally stated, the present invention can provide a process and apparatus for forming an embossed web or other article. The embossing process and apparatus can comprise a rotary embossing device having an axis of rotation, an axial direction, a radial direction, a circumferential direction, an outer peripheral surface. The embossing device can also include at least one embossing-component which extends at least radially outward from the peripheral surface, and is configured to provide for a first embossing-pattern. Additionally, the embossing device can include a rotary shaft member, and at least a first, base embossing-segment. The base embossing-segment can be operatively joined to the rotary shaft member, and configured to carry a base-section of the first embossing-component. In a particular aspect, a first, supplemental embossing-segment can be operatively joined to be selectively positionable on the rotary shaft member, and can be configured to carry a first supplemental-section of the first embossing-component. In other aspects, a first spacing mechanism can adjust a radial position of the first, supplemental embossing-segment, and a first, supplemental attachment-mechanism can secure the radial position of the second supplemental embossing-segment.

In a further aspect, the embossing device can include a second, supplemental embossing-segment, which is operatively joined to be selectively positionable on the rotary shaft member and configured to carry a second supplemental-section of the first embossing-component. A second, spacing mechanism can adjust a radial position of the second, supplemental embossing-segment on the rotary shaft member, and a second, supplemental attachment-mechanism can secure the radial position of the second, supplemental embossing-segment.

In still another aspect of the embossing device, at least a third, supplemental embossing-segment can be operatively joined to the rotary shaft member, and can be configured to provide for a third supplemental-section of the desired embossing-component. A corresponding, third spacing mechanism can adjust a radial position of the third embossing-segment on the rotary shaft member.

By incorporating its various aspects and configurations, the apparatus and method of the present invention can more reliably and more effectively emboss the target web. The embossing can be accomplished at high speed while substantially avoiding undesired cuts or breaks of the component portions of the target composite web. Additionally, the apparatus and method can more effectively produce an embossed target web having improved integrity and a desired controlled deformation.

BRIEF DESCRIPTION OF THE DRAWINGS

The various features, aspects and advantages of the present invention will become better understood with reference to the following description, appended claims and accompanying drawings where:

DETAILED DESCRIPTION OF THE INVENTION

Figure 1:
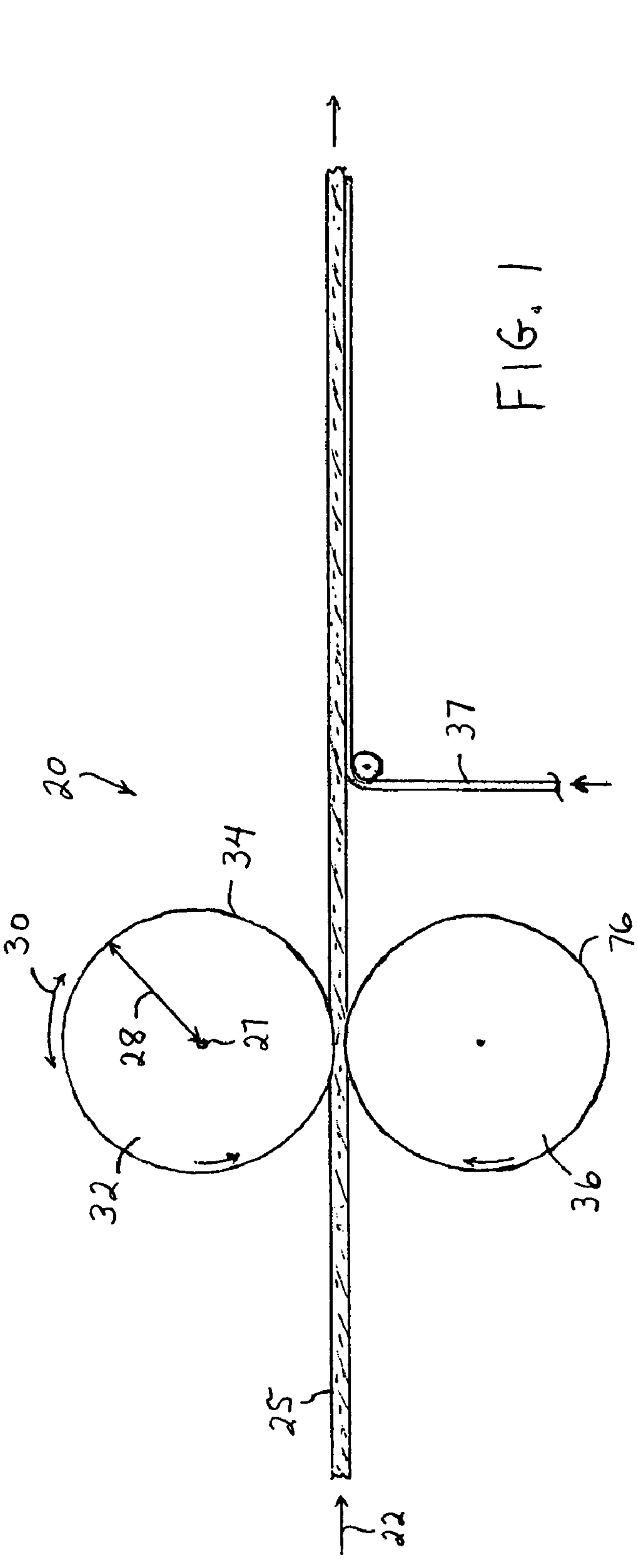
FIG. 1 shows a schematic, side elevational view of a representative method and apparatus for selectively embossing an appointed target web.

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "nonwoven" refers to a fabric web that has a structure of individual fibers or filaments which are interlaid, but not in an identifiable repeating manner.

As used herein, the terms "spunbond" or "spunbonded fiber" refer to fibers which are formed by extruding filaments of molten thermoplastic material from a plurality of fine, usually circular, capillaries of a spinneret, and then rapidly reducing the diameter of the extruded filaments.

As used herein, the phrase "meltblown fibers" refers to fibers formed by extruding a molten thermoplastic material through a plurality of fine, usually circular, die capillaries as molten threads or filaments into a high velocity, usually heated, gas (e.g., air) stream which attenuates the filaments of molten thermoplastic material to reduce their diameter. Thereafter, the meltblown fibers are carried by the high velocity gas stream and are deposited on a collecting surface to form a web of randomly disbursed meltblown fibers.

"Coform" as used herein is intended to describe a blend of meltblown fibers and cellulose fibers that is formed by air forming a meltblown polymer material while simultaneously blowing air-suspended cellulose fibers into the stream of meltblown fibers. The meltblown fibers containing wood fibers are collected on a forming surface, such as provided by a foraminous belt. The forming surface may include a gas-pervious material, such as spunbonded fabric material, that has been placed onto the forming surface.

As used herein, the phrase "absorbent article" refers to devices which absorb and contain body liquids, and more specifically, refers to devices which are placed against or near the skin to absorb and contain the various liquids discharged from the body. The term "disposable" is used herein to describe absorbent articles that are not intended to be laundered or otherwise restored or reused as an absorbent article after a single use. Examples of such disposable absorbent articles include, but are not limited to: health care related products including surgical drapes, gowns, and sterile wraps; personal care absorbent products such as feminine hygiene products (e.g., sanitary napkins, pantiliners, tampons, interlabial devices and the like), infant diapers, children's training pants, adult incontinence products and the like; as well as absorbent wipes and covering mats.

Disposable absorbent articles such as, for example, many of the feminine care absorbent products, can include a liquid pervious topsheet, a substantially liquid impervious backsheet joined to the topsheet, and an absorbent core positioned and held between the topsheet and the backsheet. The topsheet is operatively permeable to the liquids that are intended to be held or stored by the absorbent article, and the backsheet may be substantially impermeable or otherwise operatively impermeable to the intended liquids. The absorbent article may also include other components, such as liquid wicking layers, liquid distribution layers, barrier layers, and the like, as well as combinations thereof.

Disposable absorbent articles and the components thereof, can operate to provide a body-facing surface and a garment-facing surface. As used herein, "body-facing surface" means that surface of the article or component which is intended to be disposed toward or placed adjacent to the body of the wearer during ordinary use, while the "outward surface", "outward-facing surface" or "garment-facing surface" is on the opposite side, and is intended to be disposed to face away from the wearer's body during ordinary use. The outward surface may be arranged to face toward or placed adjacent to the wearer's undergarments when the absorbent article is worn.

Figure 2:
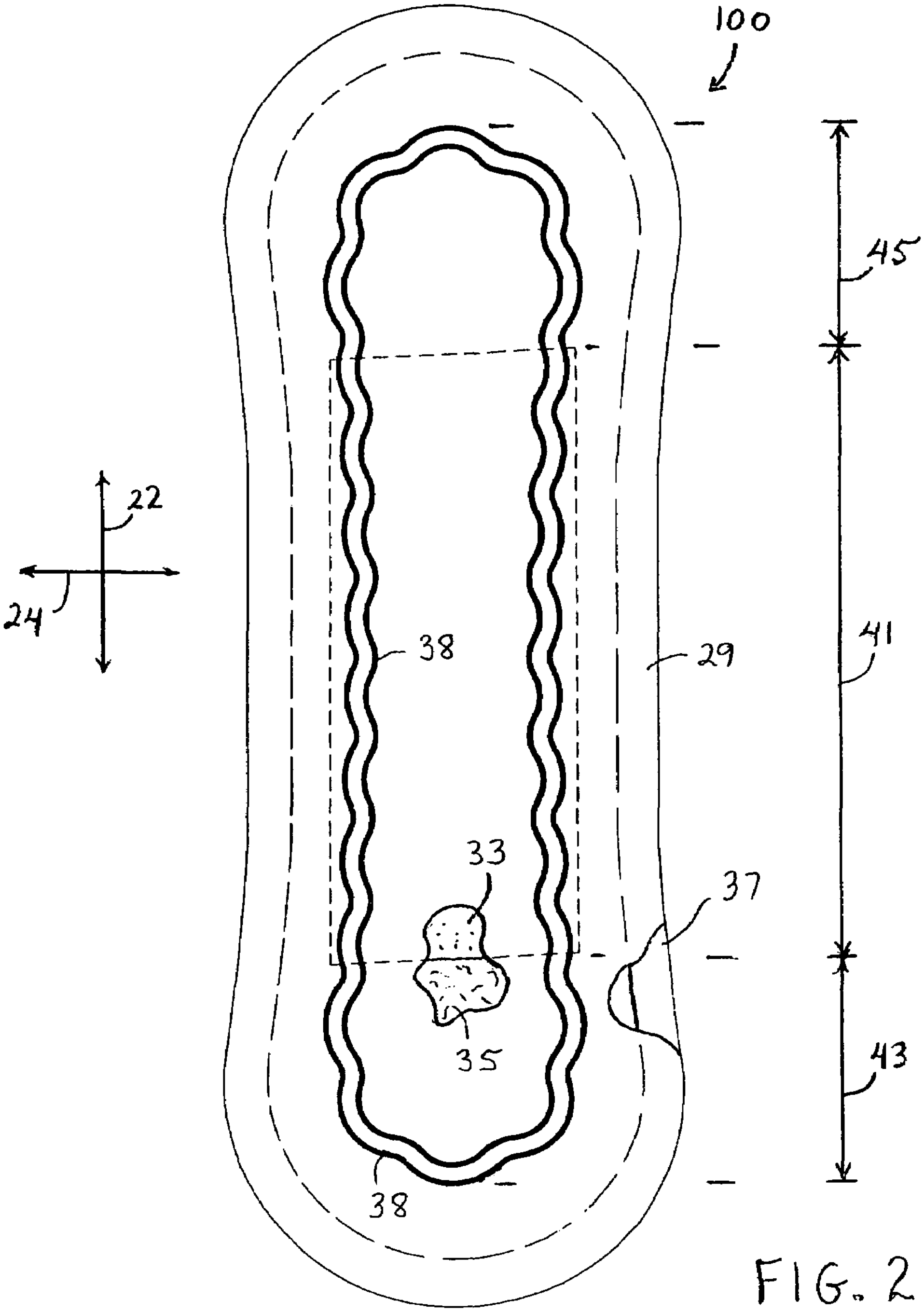
FIG. 2 shows a partially cut-away plan view of a bodyside of a representative web-segment or article that can be produced with the method and apparatus of the invention.
Figure 2A:
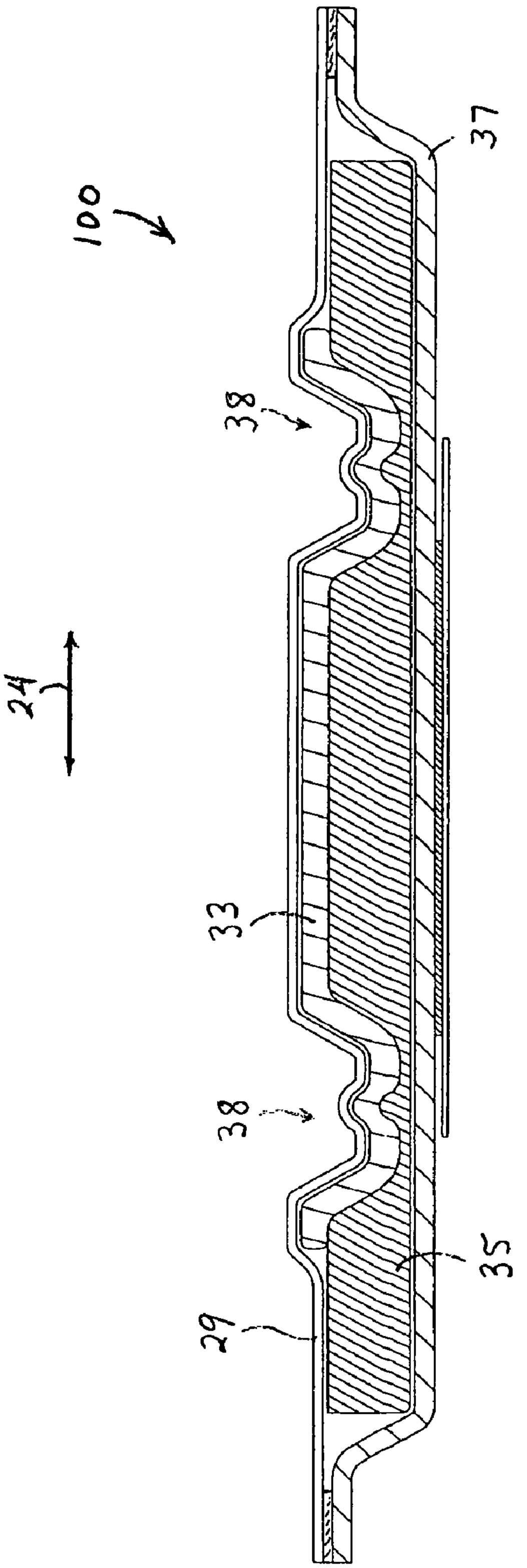
FIG. 2A shows an enlarged view of a transverse cross-section through a representative web-segment or article that can be produced with the method and apparatus of the invention.

With reference to FIGS. 1, 2 and 2A, the method and apparatus of the invention can have an appointed machine-direction 22 which extends longitudinally, and an appointed lateral cross-direction 24 which extends transversely. For the purposes of the present disclosure, the machine-direction 22 is the direction along which a particular component or material is transported length-wise along and through a particular, local position of the apparatus and method. The cross-direction 24 lies generally within the plane of the material being transported through the method and apparatus, and is aligned perpendicular to the local machine-direction 22. Accordingly, in the view of the arrangement representatively shown in FIG. 1, the cross-direction 24 extends perpendicular to the plane of the sheet of the drawing. The embossing method and apparatus 20 for forming an embossed web or other article can include moving a target web 25 along an appointed machine-direction 22 at a selected web speed, and operatively contacting the target web 25 with a rotary embossing device 32 to thereby form at least a first embossing pattern 38 in at least an appointed embossment portion of the target web 25. In a particular feature, the embossing pattern 38 can include serpentine embossing region or other non-linear embossing region.

With reference to FIGS. 1, 3, 4 and 6, the embossing method and apparatus 20 can comprise a rotary embossing device 32 having an axis of rotation 27, an axial direction 26, a radial direction 28, a circumferential direction 30, and an outer peripheral surface 34. In desired configurations, the axial direction 26 can be aligned substantially parallel to the cross-direction 24. The embossing device 32 can also include at least a first embossing-component 48 which extends at least radially outward from the peripheral surface 34, and is configured to provide for the first embossing-pattern 38. Additionally, the embossing device 32 can include a rotary shaft member 46, and at least a first, base embossing-segment 50. The base embossing-segment can be operatively joined to the rotary shaft member 46, and can be configured to carry at least a first base-section 40 of the first embossing-component 48. In a particular aspect, a first, supplemental embossing-segment 52 can be operatively joined to be selectively positionable on the rotary shaft member 46, and can be configured to carry a first supplemental-section 42 of the embossing-component 48. In other aspects, a first spacing mechanism 56 can adjust a radial position of the first, supplemental embossing-segment 52, and a first, supplemental attachment-mechanism 60 can secure the radial position of the first supplemental embossing-segment 52.

In a method aspect, the embossing process can comprise rotating a rotary embossing device 32 which has an axis of rotation 27, an axial direction 26, a radial direction 28, a circumferential direction 30, an outer peripheral surface 34, and a first embossing-component 48 that has been configured to extend radially outward from the peripheral surface 34 to provide for the first embossing-pattern 38. Additionally, the rotary embossing device 32 has included a rotary shaft member 46, and at least a first, base embossing-segment 50 which has been operatively joined to the rotary shaft member 46. In a particular feature, the embossing device 32 has included a first, supplemental embossing-segment 52 which has been joined to the rotary shaft member 46 and has been selectively positioned on the rotary shaft member. In other features, a radial position of the first, supplemental embossing-segment 52 on the rotary shaft member 46 has been adjusted with a first spacing mechanism 56, and the radial position of the first, supplemental embossing-segment 52 has been secured with a first, supplemental attachment mechanism 60.

In a desired aspect of the process and apparatus, the embossing device 32 may further include a second, supplemental embossing-segment 54, which can be operatively joined to be selectively positionable on the rotary shaft member 46 and can be configured to carry a second supplemental-section 44 of the first embossing-component 48. A second, spacing mechanism 58 can adjust a radial position of the second, supplemental embossing-segment 54 on the rotary shaft member 46, and a second, supplemental attachment-mechanism 62 can secure the radial position of the second, supplemental embossing-segment 54.

Figure 6:
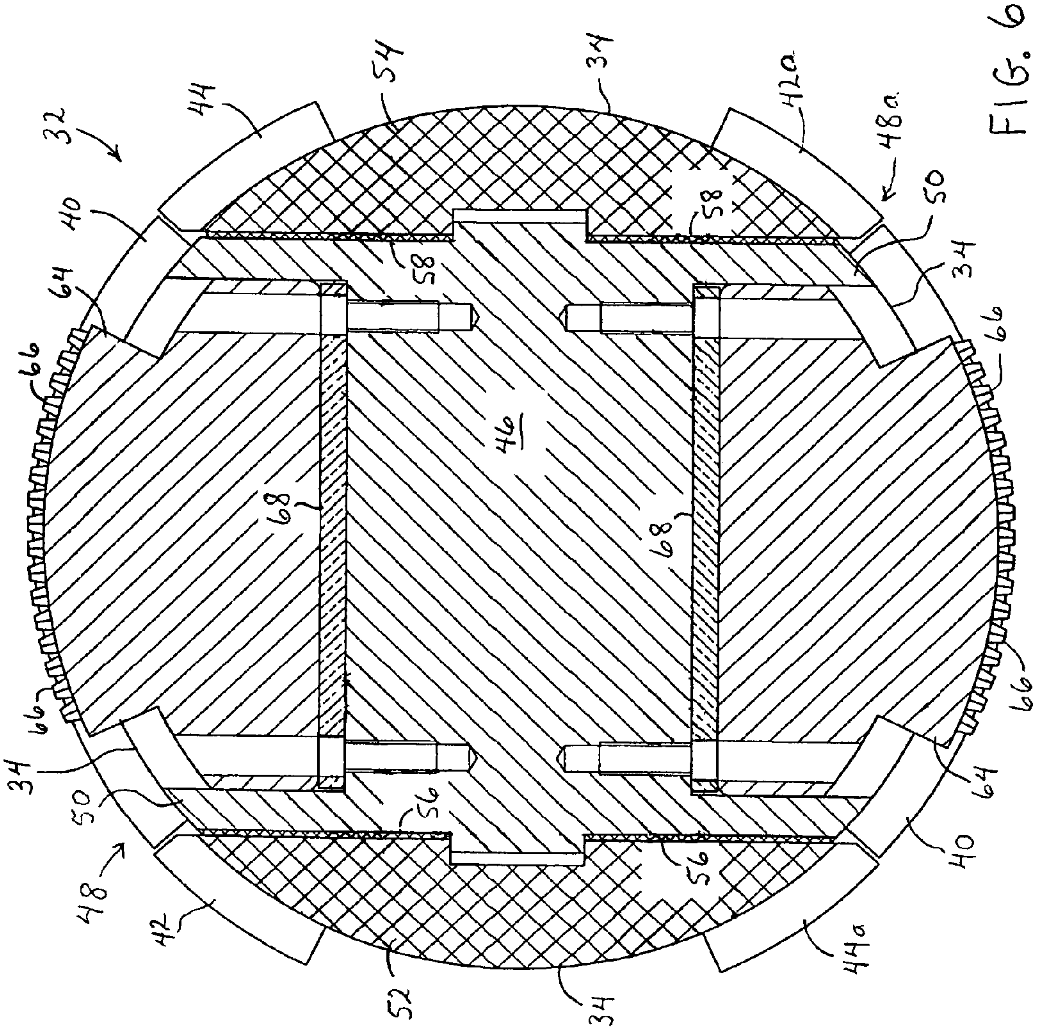
FIG. 6 shows a cross-section through a portion of a representative rotary embossing device.
Figure 10:
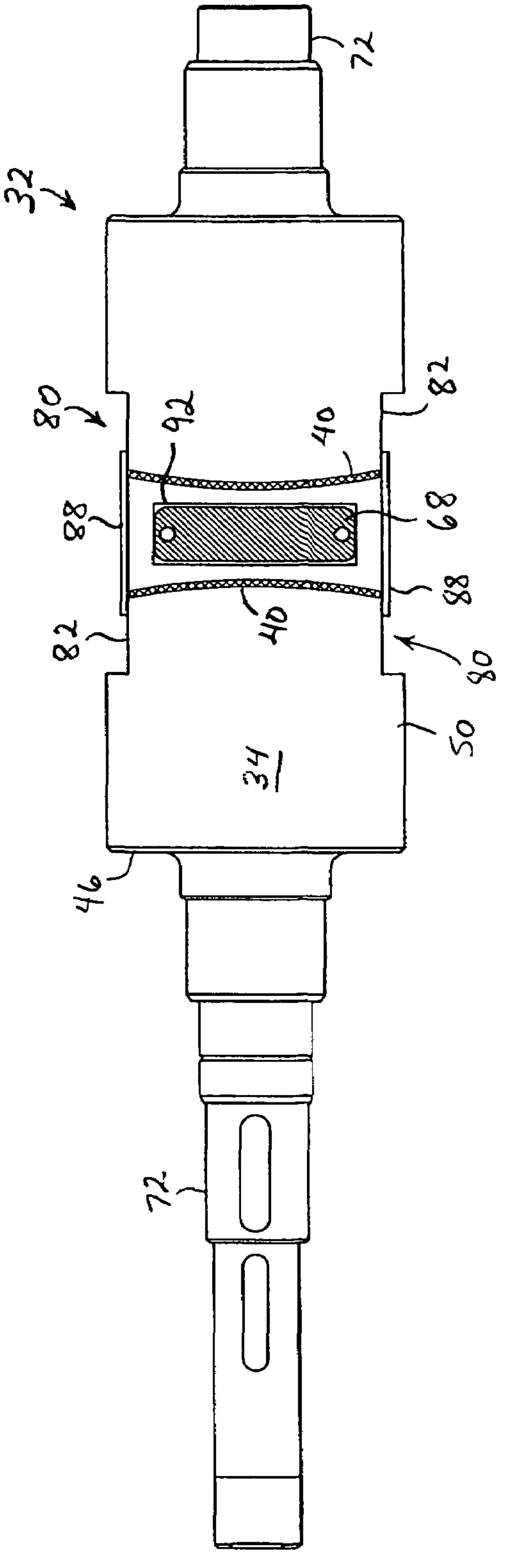
FIG. 10 shows another representative, elevational view of a rotary embossing device at the location of a third supplemental embossing-segment, where the supplemental embossing segments have been removed and a spacing mechanism has been installed.
Figure 11:
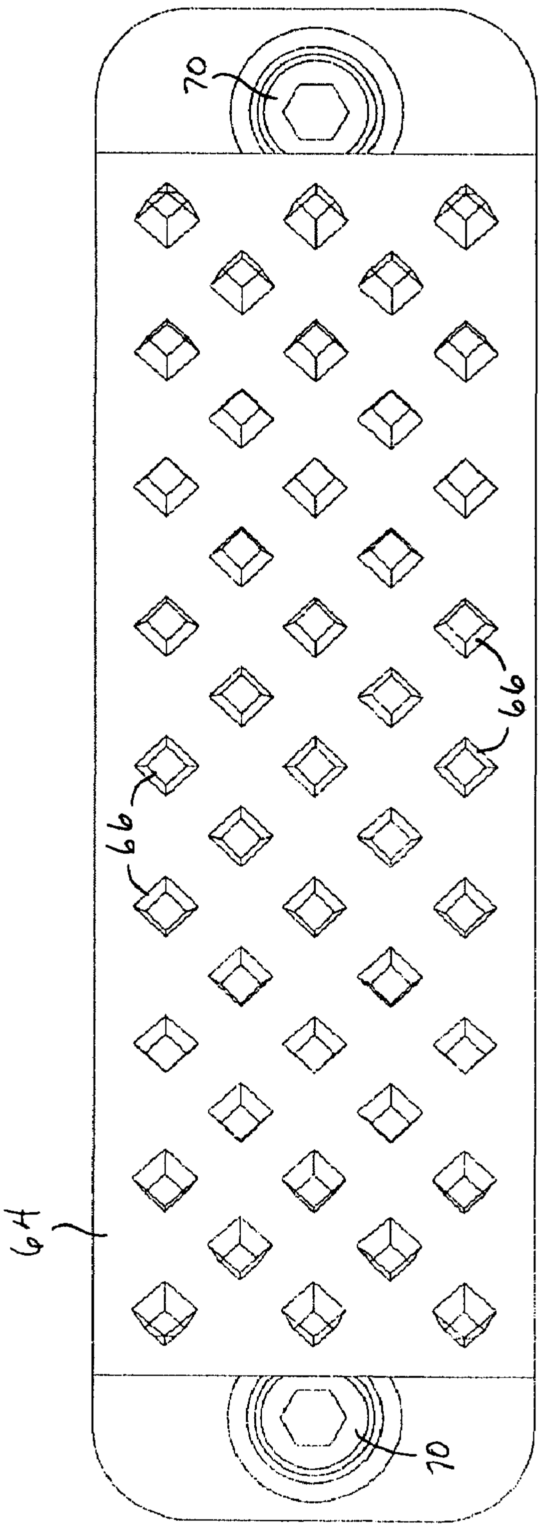
FIG. 11 shows a top view of a representative, third supplemental embossing-segment that can be employed with the rotary embossing device.
Figure 11A:
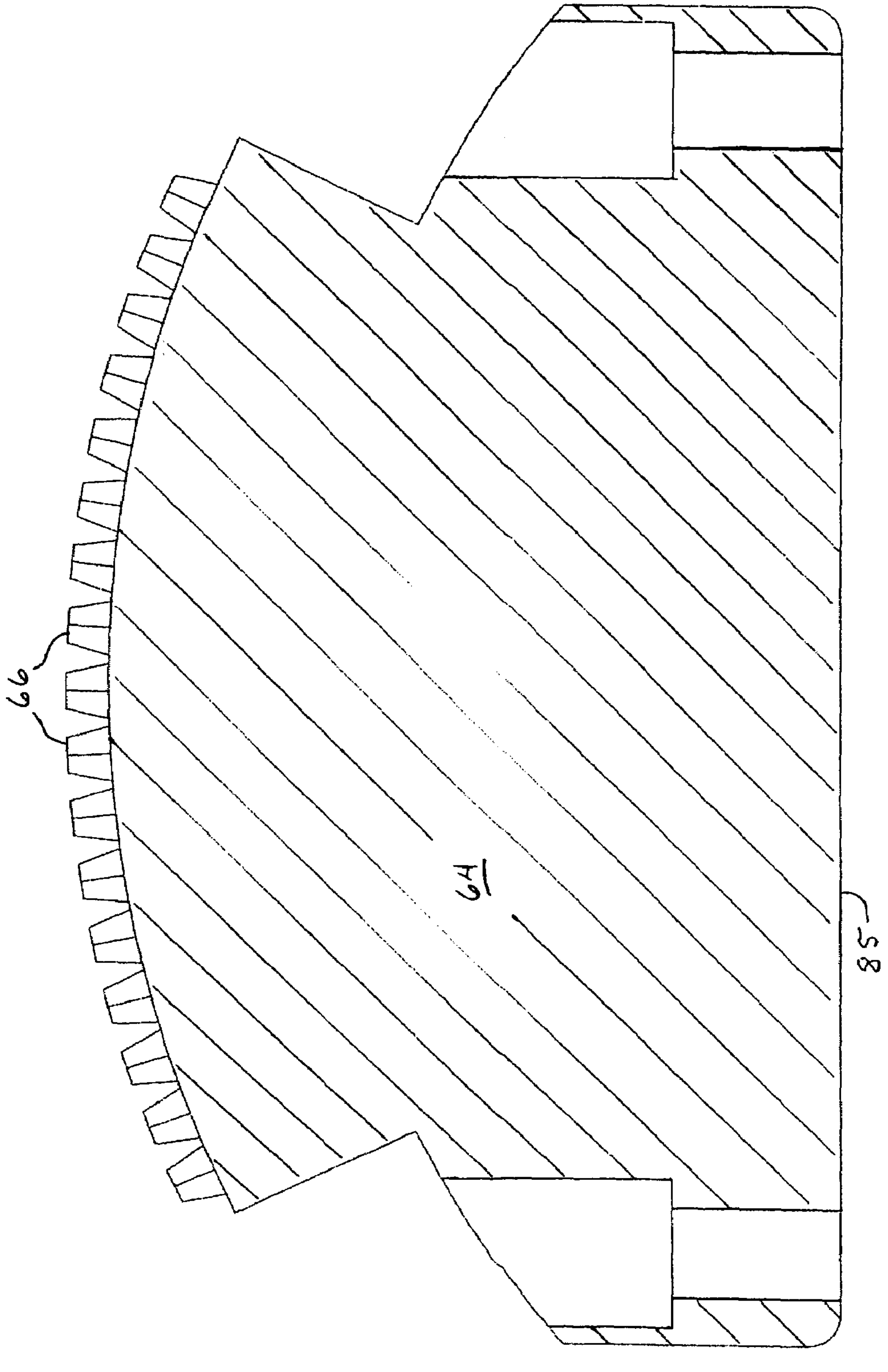
FIG. 11A shows a representative cross-section through the supplemental embossing-segment illustrated in FIG. 11.

In other aspects of the embossing device 32, at least a third, supplemental embossing-segment 64 can be operatively joined to the rotary shaft member 46, and can be configured to provide for a third supplemental-section 66 of the desired embossing-component 48 (e.g. FIGS. 6, 10 and 11). A corresponding, third spacing mechanism 68 can adjust a radial position of the third embossing-segment 64 on the rotary shaft member 46 and a third attachment-mechanism 70 can secure the radial position of the second, supplemental embossing-segment 54 on the rotary shaft member. A further aspect of the method and apparatus 20 can comprise a cooperating rotary anvil 36 which is located operatively adjacent the rotary embossing device 32.

By incorporating its various aspects, features and configuration, alone or in combination, the apparatus and method of the present invention can more reliably and more effectively emboss the target web. The embossing can be accomplished at high speed while substantially avoiding undesired cuts or breaks of the component portions of the target composite web. The technique of the invention can also help to reliably provide a more uniform and more consistent definition of the desired embossment pattern. Additionally, the apparatus and method can more effectively produce an embossed target web having improved integrity and a desired controlled deformation.

In the construction of the composite article web 25, the various components may be assembled and held together with any operative securement mechanism or system. For example, the desired attachments or securements can include adhesive bonds, cohesive bonds, thermal bonds, ultrasonic bonds, pins, snaps, staples, rivets, stitches, welds, zippers, or the like, as well as combinations thereof.

Figure 1A:
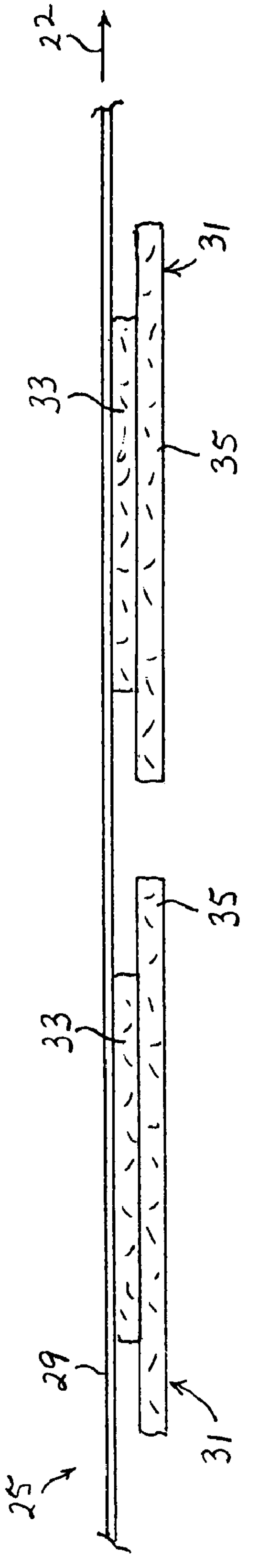
FIG. 1A shows an enlarged, schematic, side view of a representative longitudinal cross-section through a portion of a representative target web.

With reference to FIGS. 1 and 1A, the target web 25 can be configured to move at a selected web speed along the machine-direction 22 of the apparatus and method. The target web may be composed of a single material, but desirably can be a composite web which includes a plurality of materials. The target web can be readily deformed, and in particular, can be embossed. In the representatively shown configuration, the target web can include an extending substrate web, and at least one absorbent body member 31. In a desired configuration, the composite target web 25 can include a plurality of individual, spaced-apart absorbent body members 31 which are operatively distributed along the machine-directional length of the substrate web. The absorbent body members can also be operatively joined and/or secured to the substrate web. Various known, conventional mechanisms can be employed to position individual absorbent body members 31 at the desired spaced-apart locations along the machine-direction 22 of the method and apparatus. As representatively shown, the substrate web can be a web of cover material 29. Other webs may optionally be employed, as desired.

The topsheet or cover layer web 29 may include a web constructed of any operative material, and may be a composite material. For example, the cover layer can include a woven fabric, a nonwoven fabric, a polymer film, a film-fabric laminate or the like, as well as combinations thereof. Examples of a nonwoven fabric include spunbond fabric, meltblown fabric, coform fabric, a carded web, a bonded-carded-web, a bicomponent spunbond fabric or the like as well as combinations thereof. Other examples of suitable materials for constructing the cover layer can include rayon, bonded carded webs of polyester, polypropylene, polyethylene, nylon, or other heat-bondable fibers, polyolefins, such as copolymers of polypropylene and polyethylene, linear low-density polyethylene, aliphatic esters such as polylactic acid, finely perforated film webs, net materials, and the like, as well as combinations thereof. In desired arrangements, the cover layer can be configured to be operatively liquid-permeable.

Each absorbent body member 31 can include cellulosic fibers, and the absorbent body member may have a non-uniform structure or may have a substantially uniform structure, as desired. In a particular arrangement, the absorbent body 31 can include one or more component layers. As representatively shown, the absorbent body 31 can include a first absorbent layer portion 33 and at least a second absorbent layer portion 35. The component layer portions may be composed of different materials or may be composed of substantially the same material. In particular arrangements, for example, the first absorbent layer 33 may be configured to provide a liquid-intake layer, and the second absorbent layer 35 may be configured to provide a liquid-storage or retention layer.

The structure of the absorbent body 31 can be operatively configured to provide desired levels of absorbency and storage capacity, and desired levels of liquid acquisition and distribution. More particularly, the absorbent body can be configured to hold a liquid, such as urine, menses, other complex liquid or the like, as well as combinations thereof. As representatively shown, the absorbent body can include a matrix of absorbent fibers and/or absorbent particulate material. The absorbent fiber can include natural fiber, such as cellulosic fibers, and/or synthetic fiber, such as synthetic polymer fibers. The absorbent body may also include one or more components that can modify menses or inter-menstrual liquids.

The absorbent structure 31 may also include superabsorbent material. Superabsorbent materials suitable for use in the present invention are known to those skilled in the art, and may be in any operative form, such as particulate form. Generally stated, the superabsorbent material can be a water-swellable, generally water-insoluble, hydrogel-forming polymeric absorbent material, which is capable of absorbing at least about 20, desirably about 30, and possibly about 60 times or more its weight in physiological saline (e.g. 0.9 wt % NaCl). The hydrogel-forming polymeric absorbent material may be formed from organic hydrogel-forming polymeric material, which may include natural material such as agar, pectin, and guar gum; modified natural materials such as carboxymethyl cellulose, carboxyethyl cellulose, and hydroxypropyl cellulose; and synthetic hydrogel-forming polymers. Synthetic hydrogel-forming polymers include, for example, alkali metal salts of polyacrylic acid, polyacrylamides, polyvinyl alcohol, ethylene maleic anhydride copolymers, polyvinyl ethers, polyvinyl morpholinone, polymers and copolymers of vinyl sulfonic acid, polyacrylates, polyacrylamides, polyvinyl pyridine, and the like. Other suitable hydrogel-forming polymers include hydrolyzed acrylonitrile grafted starch, acrylic acid grafted starch, and isobutylene maleic anhydride copolymers and mixtures thereof. The hydrogel-forming polymers are preferably lightly crosslinked to render the material substantially water insoluble. Crosslinking may, for example, be by irradiation or covalent, ionic, Van der Waals, or hydrogen bonding. Suitable materials are available from various commercial vendors, such as the Dow Chemical Company and Stockhausen, Inc. The superabsorbent material may desirably be included in an appointed storage or retention portion of the absorbent system, and may optionally be employed in other components or portions of the absorbent article.

The first absorbent layer portion 33 may include natural fibers, synthetic fibers, superabsorbent materials, a woven fabric; a nonwoven fabric; a wet-laid fibrous web; a substantially unbonded airlaid fibrous web; an operatively bonded, stabilized-airlaid fibrous web; or the like, as well as combinations thereof. Additionally, the first absorbent layer portion 33 may include a selected quantity of superabsorbent materials, as desired. In a particular aspect, the fibrous material of the first absorbent layer portion can be substantially free of debonding agents. The first absorbent layer portion may also include one or more components that can modify menses or inter-menstrual liquid.

In a particular arrangement, the first absorbent layer portion 33 can include a thermally-bonded stabilized-airlaid fibrous web (e.g. Concert product code DT200.100.D0001), which is available from Concert Industries, a business having offices located in Gatineaux, Quebec, Canada.

The second absorbent layer portion 35 may include natural fibers, synthetic fibers, superabsorbent materials, a woven fabric; a nonwoven fabric; a wet-laid fibrous web; a substantially unbonded airlaid fibrous web; an operatively bonded, stabilized-airlaid fibrous web; or the like, as well as combinations thereof. Additionally, the second absorbent layer portion 35 can include a selected quantity of superabsorbent materials. In a particular aspect, the fibrous material of the second absorbent layer portion can be substantially free of debonding agents. In other aspects, the fibrous second absorbent layer portion may include a friction-reducing material, which can help increase the flexibility of the article in its formed embossment regions 38. The second absorbent layer portion 35 may also include one or more components that can modify menses or inter-menstrual liquids In a particular arrangement, the second absorbent layer portion 35 can include a fibrous, non-debonded, southern pine kraft woodpulp (e.g. NB 416), which is available from Weyerhaeuser, a business having offices located in Federal Way, Washington, U.S.A. In another arrangement, the shaping layer can include a fibrous woodpulp treated with an agent that helps enable densification and helps reduce stiffness (e.g. ND 416; which is also available from Weyerhaeuser).

Each absorbent layer portion 33, 35 can have a corresponding machine-directional length, and cross-directional width. As representatively shown, the length and/or width of the first absorbent layer portion 33 can be smaller than the length and/or width of the second absorbent layer portion 35. Alternatively, the length and/or width of the first absorbent layer portion 33, can be relatively larger than the length and/or width of the second absorbent layer portion 35. As a result, the composite web 25 can have a non-uniform basis weight distribution. Additionally, the composite web can include a non-uniform, z-directional thickness dimension.

The various portions or components of each absorbent body 31 can be joined and/or secured together employing any operative technique. A variety of suitable mechanisms or systems known to one of skill in the art may be utilized to achieve any such secured relation. Examples of such securing mechanisms or systems can include, but are not limited to, the application of adhesives in a variety of patterns between the two adjoining surfaces, entangling at least some portions of one absorbent body component with portions of the adjacent surface of another component, or fusing at least portions of the adjacent surface of one component to portions of another component of the absorbent.

In the representatively shown configuration of the method and apparatus, the components of the target web 25 can be attached with conventional construction adhesive. Any operative adhesive may be employed. Suitable adhesives can, for example, include hot melt adhesives, pressure-sensitive adhesives, solvent-based adhesives, pressure-sensitive adhesives, or the like as well as combinations thereof.

In a particular feature, the cellulosic fibers in one or more portions of the composite target web 25 can be treated with a friction-reducing material, and/or can be configured to be substantially free of any separately provided debonding agent. In another feature, the cellulosic fibers in one or more portions of the composite web 25 can be provided with a moisture content which is at least a minimum of 4 wt %. The moisture content can alternatively be at least about 4.8 wt %. In another aspect, the moisture content can be not more than a maximum of about 11 wt %. The moisture content can alternatively be not more than about 7.2 wt % to provide improved performance. If the moisture content of the cellulosic fibers is too low, the ability to form the desired absorbent body can be degraded due to the generation of static electricity in the forming system. During the embossing process, an excessively low moisture content can result in poor hydrogen bonding, and a poor formation and retention of the desired embossments. If the moisture content of the cellulosic fibers is too high, there can be an undesired growth of microbes can occur in the cellulosic fibers.

In another aspect, the composite web 25 can be subjected to a selected tension to provide a selected web-strain. Accordingly, the composite web can exhibit a selected web elongation along the machine-direction 22 of the process and apparatus. In a particular aspect, the web-strain can be up to a maximum of about 5%, or more. The web-strain can alternatively be up to about 3%, and can optionally be up to about 2% to provide improved performance. In other aspects, the web strain can be a value greater than 0%. The web strain can alternatively be at least a minimum of about 0.1%, and can optionally be at least about 0.2% to provide further benefits. If the web strain is outside the desired values, the process and apparatus can exhibit a poor formation of the desired embossments, a poor control of the web path, or an excessive cutting or severing of one or more of the materials employed to form the composite web 25. The web strain can be determined by employing the following calculation:

$$\%\ \text{web strain}=100^*(L_T-L_0)/L_0$$

where: $L_0$=length of a web portion which is untensioned;

$L_T$=length of the same web portion which is tensioned.

A further feature of the apparatus and process can include moving the composite web 25 at a distinctively high web speed. The web speed can be at least a minimum of about 1.9 m/sec (meters per second). The web speed can alternatively be at least about 2.5 m/sec (about 492 feet per minute), and can optionally be at least about 3.0 m/sec (about 590 feet/min) to provide improved performance. In another aspect, the web speed can be up to maximum of about 7.5 m/sec (about 1476 feet/min), or more. The web speed can alternatively be up to about 6.5 m/sec (about 1279 feet/min), and can optionally be up to about 6.0 m/sec (about 1181 feet/min) to provide improved benefits. In other arrangements, the web speed can be up to about 3.5–5.5 m/sec (about 688–1082 feet per min) to provide improved efficiency.

If the web speed is too low, manufacturing costs to may become excessive. Additionally, when the web speed is too low, the article may be excessively embossed, and the article can become excessively stiffness. If web speed is too high, the embossments may be poorly formed or defined, due to the reduction in dwell time during which the embossing member can effectively operate, and due to the increased rate at which the embossing deformations need to be formed.

The cover layer web 29 or other substrate layer can be delivered into the method and apparatus from a suitable supply source, and an operative attaching technique can be employed to operatively secure the cover web 29 to the absorbent body members 31 by bonding or otherwise attaching all or a portion of the adjacent surfaces to one another. A variety of attaching mechanisms or systems known to one of skill in the art may be utilized to achieve any such secured relation. Examples of such mechanisms or systems include, but are not limited to, the application of adhesives in a variety of patterns between the two adjoining surfaces, entangling at least portions of the adjacent surface of the absorbent with portions of the adjacent surface of the cover, or fusing at least some portions of the cover to portions of the adjacent surface of the absorbent. In desired arrangements, a conventional construction adhesive can be employed to assemble together the various components of the desired composite web 25. In a particular aspect, a selected pattern of adhesive can be distributed between the cover layer web 29 and the absorbent body members 31.

Any operative adhesive applicator may be employed. Suitable applicators can include adhesive spray devices, adhesive coating devices, adhesive printing devices, or the like, as well as combinations there of. Any operative adhesive may be employed. Suitable adhesives can, for example, include hot melt adhesives, pressure-sensitive adhesives, solvent-based adhesives, pressure-sensitive adhesives, or the like as well as combinations thereof.

With reference to FIGS. 2 and 2A, the target web 25 can be cut or otherwise separated into individual product or article segments 100 by employing any suitable separating system. Such systems are well known and available from commercial vendors. As representatively shown, the embossing device 32 can be configured to operatively form a desired, first embossing pattern 38 on and/or into a selected surface of each article segment, and the embossing pattern can include a base-section 41 and at least a first supplemental section 43. Additionally, the embossing pattern can include a second supplemental section 45. In the representatively shown example, the base-section 41 can provide an intermediate section of the embossing pattern, and the first and second supplemental sections 43, 45 can provide longitudinally opposed, end portions of the embossing pattern.

With reference to FIG. 1, the rotary embossing device 32 can include a rotary embossing roll, and the rotary embossing device can be positioned cooperatively adjacent an anvil member 36. As representatively shown, the anvil member can be a rotary mechanism, but may optionally be a non-rotary mechanism. Desired configurations of the anvil member 36 can include the representatively shown rotary anvil, which is configured to counter-rotate relative to the rotary embossing device 32 to provide an operative nip region between the embossing device 32 and anvil 36. In the nip region, it should be readily appreciated that the particular gap distance between the operative outer surface of the anvil and the operative outer surface of the rotary embossing device can be adjusted in a conventional manner to accommodate the desired speed, thickness and materials of the target web 25. The anvil includes an outer peripheral anvil surface 76, which may be a generally smooth surface, or may optionally be a selectively patterned surface, as desired. In particular configurations, the anvil outer surface may include an anvil pattern which cooperates with the selected embossing pattern. For example, the anvil pattern may cooperatively match the first embossing pattern 38.

Any conventional power mechanism or system can be employed to cooperatively drive the rotary embossing device 32 and/or the rotary anvil 36. Such power mechanisms can include engines, motors, electro-magnetic power systems, fluidic power systems or the like as well as combinations thereof. The selected drive system can be configured to provide the embossing device 32 with a selected surface speed at the outer peripheral surface 34, and in a desired arrangement, the peripheral surface speed can be configured to substantially equal the web speed of the target web 25 that is appointed for embossment.

The embossing device 32 includes an outer peripheral surface 34 which can have any operative shape. In the example of the representatively shown configuration, the outer peripheral surface 34 can be configured to be generally cylindrical. Optionally, the outer peripheral surface may be non-cylindrical. Generally stated, the outer peripheral surface 34 can extend along the circumferential direction 30 and along the axial direction 26 of the embossing device.

Additionally, the outer peripheral surface, or selected portions of the peripheral surface, may be substantially continuous or may be discontinuous, as desired.

The embossing device 32 can include a rotary shaft member 46, and an outer rim surface of the shaft member can provide the outer peripheral surface 34 of the embossing device. Additionally, the shaft member can include an axle portion 72 for rotatably mounting the shaft member 46 on any suitable system of bearing supports. Such support systems are well known and available from commercial vendors.

The various component parts of the rotary embossing device 32 (e.g. the shaft member 46) can be constructed from any suitable material, such as metal, plastic, rubber, synthetic polymers, composite materials or the like as well as combinations thereof. In desired configurations, the embossing device 32 can be constructed with steel. Additionally, the embossing device may be chilled, heated or unheated, as desired. A particular arrangement can employ an embossing device which is heated to a temperature within the range of about 280–320° F. (about 138–160° C.).

The rotary embossing device can also provide an effective roll radius, measured from its rotational axis 27 to its operative, outermost peripheral surface 34. As illustrated, for example, the roll radius can be provided by the shaft member 46. In a particular aspect, the roll radius can be at least a minimum of about 7.5 cm. The roll radius can alternatively be at least about 11 cm, and can optionally be at least about 14 cm to provide improved performance. In another aspect, the roll radius can be up to a maximum of about 32 cm, or more. The roll radius can alternatively be at least about 25 cm, and can optionally be at least about 19 cm to provide improved benefits. If the roll radius is outside the desired values, the method and apparatus can exhibit insufficient dwell time during the embossing operation, or can require excessive amounts of space and cost.

With reference to FIGS. 3 through 6, at least one embossing-component 48 can be located on the outer peripheral surface 34. The embossing-component 48 extends at least radially outward from the peripheral surface 34, and is configured to provide for a first embossing-pattern (e.g. embossing pattern 38). In a desired configuration, a plurality of two or more of such embossing-components 48 can be distributed over the outer peripheral surface 34 in a desired array. For example, the plurality of embossing-components can be arranged in series along the circumferential direction of the embossing device 32, and the serial arrangement may be irregular or substantially regular, as desired. As representatively shown (e.g. FIGS. 5 and 6), a pair of the first embossing-components 48 can be substantially equally distributed along the circumference of the outer peripheral surface 34.

The embossing-component 48 can include portions that are substantially linear, and/or may include portions that are curvilinear or otherwise nonlinear. For example, the embossing-component may have an undulating serpentine configuration, a zig-zag configuration or other back-and-forth configuration, (e.g. FIG. 3). Such back-and-forth configurations can desirably be located along at least an intermediate, base-section 40 of the embossing-component 48.

In addition to the base section 40, each embossing-component 48 can include a first supplemental-section 42, and can also include a second supplemental-section 44. In a desired configuration, the base-section 40 can provide an intermediate portion of the embossing component 48, and the first and second supplemental-sections 42 and 44 can provide longitudinally/circumferentially opposed end portions of the embossing-component 48.

Figure 3:
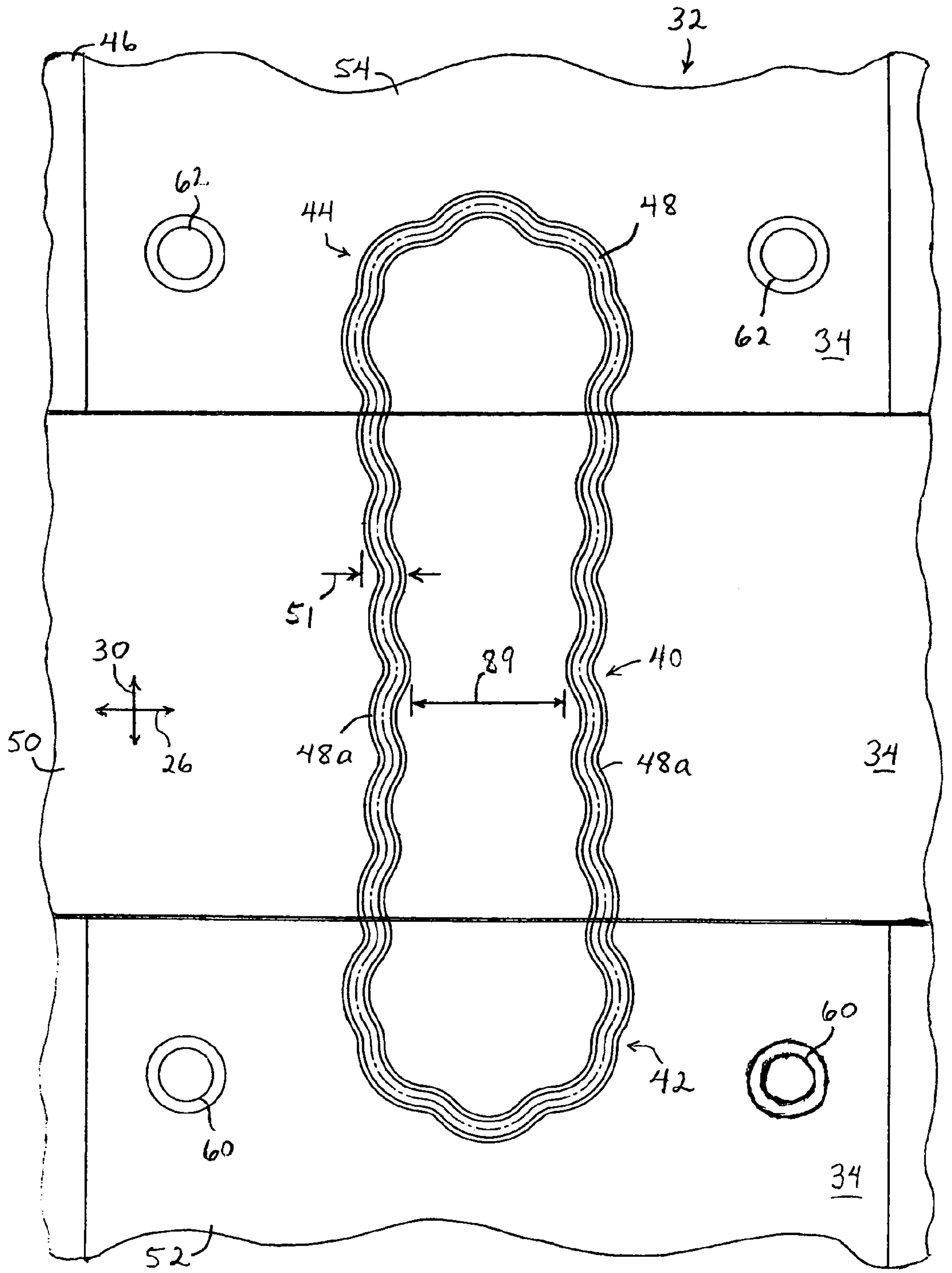
FIG. 3 shows a schematic top view of a representative portion of a rotary embossing device having an embossing component, in which the circumferential curvature of the embossing device has been flattened.

With reference to FIG. 3, the embossing-component 48 can extend lengthwise in the circumferential direction 30 along the peripheral surface 34 of the embossing device 32. In at least its intermediate, base-section 40, the embossing-component 48 can have a nonlinear configuration which extends over a distance of at least about 4–5 cm. The nonlinear region of the base-section 40 can desirably extend circumferentially at least about 6 cm, and can more desirably extend circumferentially at least about 10 cm across the intermediate portion of the embossing-component 48. In a particular feature, the intermediate base-section 40 can provide the middle 35 percent (35%) of an overall, circumferential length of the embossing-component 48. In another feature, the embossing-component can extend substantially continuously across the selected circumferential distance in the intermediate base-section of the embossing-component. Additionally, the curvilinear or otherwise nonlinear embossing-component 48 can extend at least partially across the first and/or second supplemental-sections 42, 44 of the embossing-component.

As representatively shown, the embossing-component 48 can have a pair of transversely spaced-apart, laterally opposed side-portions **48*a* which extend generally along the circumferential-direction 30 at locations that are appointed to be generally adjacent a pair of laterally opposed side edges of an individual absorbent body 31 during the embossing operation. Additionally, the embossing-component 48 can include a circumferentially opposed pair of end-portions, and at least a part of the end-portions can extend generally laterally along the axial-direction 26 at positions that can be appointed to become generally adjacent a pair of circumferentially opposed end edges of the absorbent body during the embossing operation. As representatively shown, the end-portions can be provided by the first and second supplemental-sections 42, 44. Either or both of the side-portions 48*a* can be configured to include the various features and aspects attributed to the embossing-component 48. Similarly, either or both of the end-portions may include desired features and aspects of the embossing-component 48**.

The side-portions and end-portions of the embossing-component 48 can be configured to provide a desired outline shape, and the embossing-component can extend along at least the bodyside of the embossing-component to provide the desired shape. The embossing-component may also extend along the garment-side surface of the absorbent body 31. In particular examples, the path of the embossing-component may provide a symmetrical shape, an asymmetrical shape, a regular or irregular rectilinear shape, a regular or irregular curvilinear shape or the like, as well as combinations thereof. The embossing-component may be configured to be discontinuous or substantially continuous, as desired. In particular arrangements, the embossing-component 48 can be arranged to effectively provide a substantially closed-shape. In other desired configurations, the embossing-component 48 can become located proximate to and relatively inboard from a perimeter edge of a corresponding, individual absorbent body 31 during the embossing operation. In a particular aspect, the embossing-component 48 can be configured to extend along substantially an entirety of the absorbent body perimeter during the embossing operation.

The curvilinear or nonlinear configuration of the embossing-component 48 can have a distinctive frequency of its traversing occurrence. As representatively shown in FIGS. 2 and 3, each traversing occurrence can include a single back-and-forth cycle of the pattern array selected for the nonlinear embossing-component 48. The occurrence of the traversing cycles may be present in an irregular, non-repeating pattern, in a substantially regular, repeating pattern or in a combination thereof, as desired. Additionally, the traversing frequency can occur along at least the intermediate base-section 40 of the embossing-component. In particular aspects, the traversing occurrence can be at least a minimum of about 1 cycle. The traversing occurrence can alternatively be at least about 1.2 or 1.5 cycles, and can optionally be at least about 2 cycles to provide improved performance. In other aspects, the traversing occurrence can be up to a maximum of about 10 cycles, or More. The traversing occurrence can alternatively be up to about 8 cycles, and can optionally be up to about 6 cycles to provide improved effectiveness. In a further aspect, the desired number of cycles can be distributed or otherwise arranged to occur with a 5 cm circumferential-length of the intermediate section of the embossing-component. If the traversing occurrence is outside the desired values or parameters, the target web 25 and resulting articles 100 can exhibit an excessive pivoting or hinging action along the nonlinear embossment region 38 or an excessive collapsing of the channel structure of the embossment region. Traversing frequencies outside of the desired values may also degrade the embossing operation. For example, there may be a poor formation of the embossments or an undesired cutting of the target web.

As representatively shown, the embossing-component 48 can have back-and-forth pattern-shape which can extend over a selective lateral traversing distance 51. The back-and-forth shape can, for example, include an undulating pattern, a serpentine pattern, a zig-zag pattern, a generally sinusoidal pattern, a cycloidal pattern, a semi-cycloidal pattern, a wavy pattern or the like, as well as combinations thereof. The lateral traversing distance 51 can be determined by measuring the lateral distance between the most-outboard-edge to the most-inboard-edge of the nonlinear embossing-component 48, as observed during a back-and-forth cycle of the selected, nonlinear embossment pattern. The selected nonlinear pattern can extend a distance of at least 4 cm along the circumferential direction 30 within the intermediate base-section 40 of the embossing-component. As previously discussed, the back-and-forth nonlinear pattern can optionally extend across a selected circumferential distance within the intermediate section 40 of the embossing-component 48.

The embossing-component 48 can be configured to include a selected, lateral traversing distance 51. In a particular aspect, the lateral traversing distance 51 can be at least a minimum of about 0.1 cm. The lateral traversing distance can alternatively be at least about 0.2 cm, and can optionally be at least about 0.3 cm to provide improved performance. In other aspects, the lateral traversing distance can be up to a maximum of about 2.3 cm, or more. The lateral traversing distance can alternatively be up to about 1.5 cm, and can optionally be up to about 1.1 cm to provide improved effectiveness. A desired arrangement can include a traversing distance which is within the range of about 0.7–0.8 cm.

If the traversing distance 51 is outside the desired values, there can be an excessive pivoting or hinging action along the corresponding embossment region formed in the target web 25. Additionally, there can be an excessive collapsing of the channel structure. Embossing-components which traverse beyond the desired values may also result in undesirable stiffness in the edges of the individual product articles 100 formed from the target web 25. Additionally, the formed articles 100 can exhibit inadequate fit due to an insufficient medial spacing distance 89 (e.g. FIG. 3) between the inboard edges of the laterally opposed sections 48*a* of the embossing-component.

A detailed description of a suitable embossing-component and an associated embossing method and apparatus can be found in U.S. patent application Ser. No. 07/205,063 entitled METHOD AND APPARATUS FOR FORMING AN EMBOSSED ARTICLE by M. Weiher et al., which was filed Aug. 14, 2003. The entire disclosure of this document is incorporated herein by reference in a manner that is consistent herewith.

Figure 4:
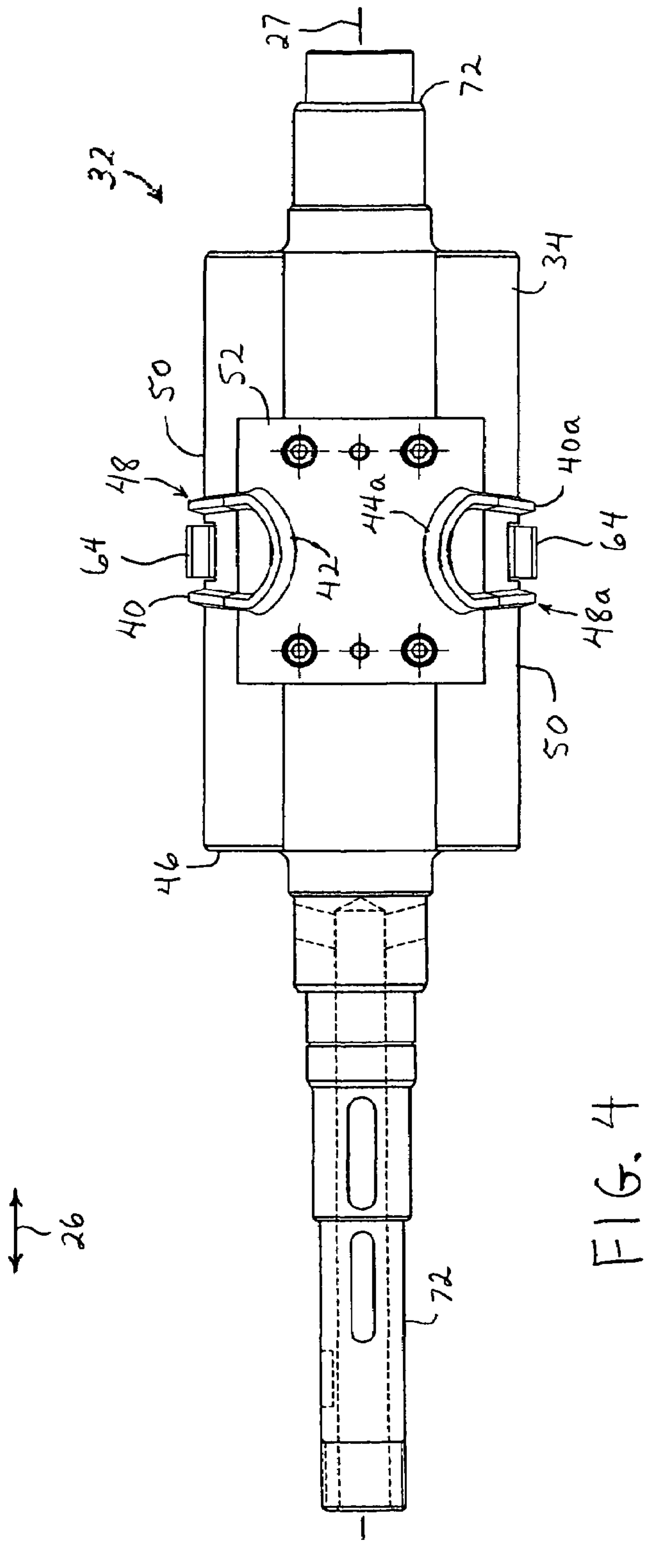
FIG. 4 shows a representative elevational view of a rotary embossing device that can be employed with the present invention.
Figure 5:
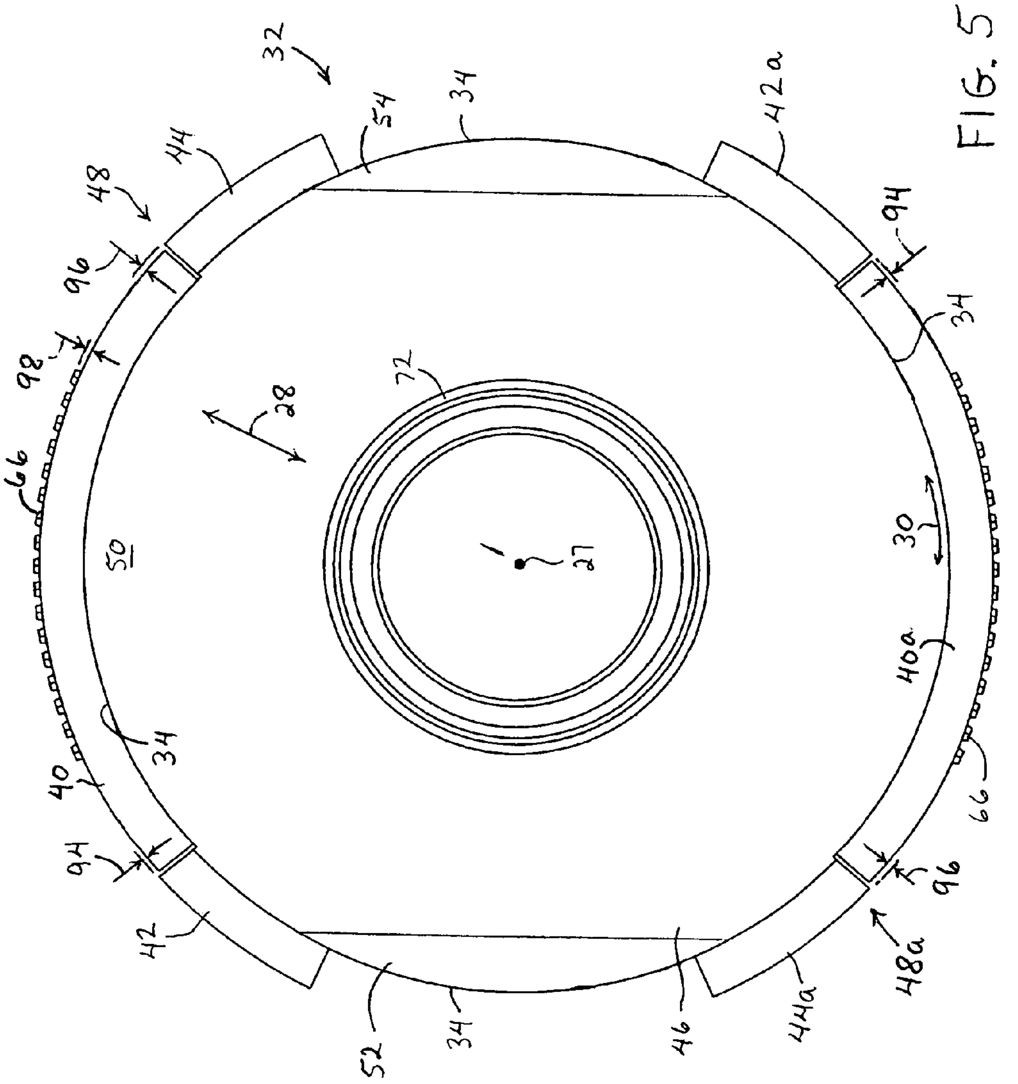
FIG. 5 shows an end view of a representative rotary embossing device that can be employed with the present invention.

With reference to FIGS. 4, 5 and 6, the embossing device 32 can include a base embossing-segment 50 and a first supplemental embossing-segment 52. Additionally, the embossing device can include a second supplemental embossing-segment 54. At least a first, base embossing-segment 50 can be operatively joined to the rotary shaft member 46, and can be configured to operatively carry the base-section 40 of the embossing-component 48. The base-segment 50 can be integrally formed with the embossing device (e.g. integrally formed with the rotary shaft member 46). Additionally, the base-section 40 of the embossing component 48 can be integrally formed with the base-segment 50. Accordingly, the base-section 40 of the embossing component 48 may be integrally formed with the rotary shaft member 46, and may be integrally formed with the outer peripheral surface 34 of the base-segment 50. Alternatively, the base-segment 50 can be a separately provided member which is operatively assembled and attached to the rotary shaft member 46. The first, base-segment 50 can be selectively positionable on the rotary shaft member 46. In a particular aspect, the radial position of the base-segment relative to the shaft member 46 may be adjustable. In still another arrangement, the base-section 40 of the embossing component 48 may be a separately provided member which is operatively assembled and attached to the base-segment 50.

In desired arrangements of the process and apparatus, the rotary embossing device 32 can include a plurality of base embossing-segments 50 which are operatively connected and joined to the rotary shaft member 46. Two or more base embossing-segments 50 may be unequally spaced or substantially equally spaced along the circumference of the rotary embossing device 32. Each of the embossing-segments 50 can operatively carry an associated base-section 40 of a corresponding embossing component 48. As representatively shown, a pair of the base embossing-segments 50 can be substantially equally spaced along the circumference of the rotary embossing device 32.

The first, supplemental embossing-segment 52 can operatively carry the first supplemental-section 42 of the embossing-component 48, and can be operatively connected and held to provide a combination wherein the embossing-segment 52 is selectively positionable on the rotary shaft member 46. Additionally, the second, supplemental embossing-segment 54 can carry a second supplemental-section 44 of the embossing-component 48, and can also be operatively connected and held to provide a combination in which the second embossing-segment 54 is selectively positionable on the rotary shaft member 46. As representatively shown, the second, supplemental embossing-segment 54 can be similar or substantially the same as the first, supplemental embossing-segment 52. Alternatively, the second embossing-segment 54 can significantly differ from the first embossing-segment 52.

With reference to FIGS. 5 through 7A, an individual supplemental embossing-segment which is configured to carry a selected plurality of the supplemental-sections of the selected embossing-component. In configurations where the embossing device 32 is constructed and arranged to provide a plurality of embossing components 48, for example, the supplemental embossing-segment 52 can be configured to carry a supplemental-section 42 of a first embossing-component 48 and a supplemental embossing-section **44*a* of another embossing-component 48*a*. Similarly, the second supplemental embossing-segment 54 can be configured to carry a supplemental-section 44 of a first embossing-component 48 and a supplemental embossing-section 42*a* of another embossing-component 48*a***.

As representatively shown, an individual, supplemental embossing-segment 52 and/or 54 of the rotary embossing device 32 can include a circumferentially arcuate outer surface, and a substantially flat or planar interior base surface 84. At least one supplemental-section 42, 44 of the selected embossing component 48 is formed or otherwise operatively joined to the outer surface of the embossing-segment. Additionally, an appropriate array of bore holes can be formed through the individual supplemental embossing-segment 52, 54 to accommodate the representatively shown system of fastening bolts.

With reference to FIGS. 4–6 and 10–11A, the third, supplemental embossing-segment 64 can also be operatively connected and held in a combination wherein the third embossing-segment 64 is selectively positionable on the rotary shaft member 46. As representatively shown, the third, supplemental embossing-segment 64 can be configured to carry a third supplemental embossing-section 66 of a desired embossing component. In desired arrangements of the process and apparatus, the rotary embossing device 32 can include a plurality of the third embossing-segments 64 which are operatively connected and joined to the rotary shaft member 46. Two or more third supplemental embossing-segments 64 may be unequally spaced or substantially equally spaced along the circumference of the rotary embossing device 32. Each of the embossing-segments 64 can operatively carry an associated third supplemental-section 66 of a corresponding embossing component. As representatively shown, a pair of the third supplemental embossing-segments 64 can be substantially equally spaced along the circumference of the rotary embossing device 32.

The rotary shaft member 46 can be configured to include an operative support mechanism which is appropriately configured to hold and carry the third supplemental embossing-segment 64. As representatively shown, for example, the support mechanism can include a socket region 92 that is formed into the shaft member 46 and is configured to have a bottom, support floor therein. Each socket region 92 can be appropriately sized and shaped to operatively accommodate the placement of the third supplemental embossing-segment 64 into the socket region.

As representatively shown, an individual, supplemental embossing-segment 64 of the rotary embossing device 32 can include a circumferentially arcuate outer surface, and an interior base surface 85. The illustrated base surface is substantially flat or planar, but may optionally be non-planar. At least one supplemental-section 66 of the selected embossing component 48 is formed or otherwise operatively joined to the outer surface of the third embossing-segment. Additionally, an appropriate array of bore holes can be formed through each third supplemental embossing-segment 64 to accommodate the representatively shown system of fastening bolts.

The third supplemental-section 66 of the desired embossing component 48 can be positioned and arranged on the outer peripheral surface of the third supplemental embossing-segment 64 in any operative arrangement. The third supplemental-section 66 of the embossing-component 48 can, for example, be configured to provide a desired embossing pattern. The embossing pattern may be continuous or discontinuous, and may be regular or irregular, as desired. As representatively shown, for example, the third supplemental embossing-section 66 can be configured to provide a discontinuous pattern of generally rectangular embossments that are uniformly distributed across the outer surface of the third supplemental embossing-segment 64.

Figure 8:
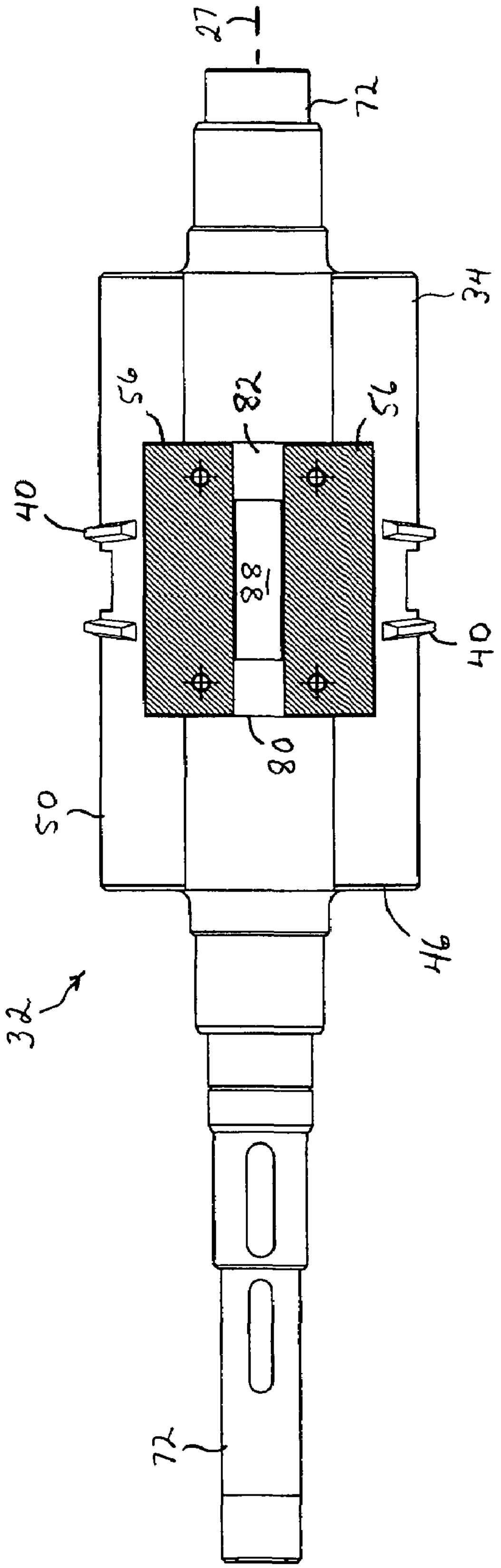
FIG. 8 shows a representative elevational view of a rotary embossing device at the location of a first supplemental embossing-segment, where the supplemental embossing segments have been removed and a spacing mechanism has been installed.

With reference to FIGS. 6, 8 and 10, the first spacing mechanism 56 can adjust a radial positioning of the first, supplemental embossing-segment 52, and a second spacing mechanism 58 can adjust a radial positioning of the second, supplemental embossing-segment 54. Additionally, a third spacing mechanism 68 can adjust a radial positioning of the third, supplemental embossing-segment 64. Accordingly, the rotary embossing device 32 can be configured to include a distinctively stepped configuration, as observed along the circumferential-direction of its outer peripheral surface 34. In a particular aspect, the embossing-component 48 can be configured to provide two or more stepped regions. The various employed spacing mechanism can be provided by any operative device or system. For example, suitable spacing mechanisms can include a system of shims, a system with a adjustable pneumatic or hydraulic bladder, a system of adjustable screws or the like, as well as combinations thereof.

As representatively shown, the spacing mechanisms 56 and/or 58 can be provided by a system of separately provided shims 74, and the third spacing mechanism 68 can be provided by a system of separately provided shims 75. Each of the shims can have a corresponding shim thickness 86. Each shim member 74, 75 can also be operatively sized and shaped to allow a placement between the rotary shaft member 46 and its corresponding supplemental embossing-segment (e.g. embossing-segment 52, 54, 64) of the selected embossing-component. The shims can be made of any suitable material, such as metal, plastic, wood, ceramic, synthetic composites or the like, as well as combinations thereof. In a desired arrangement the shims can be constructed from brass.

Figure 9:
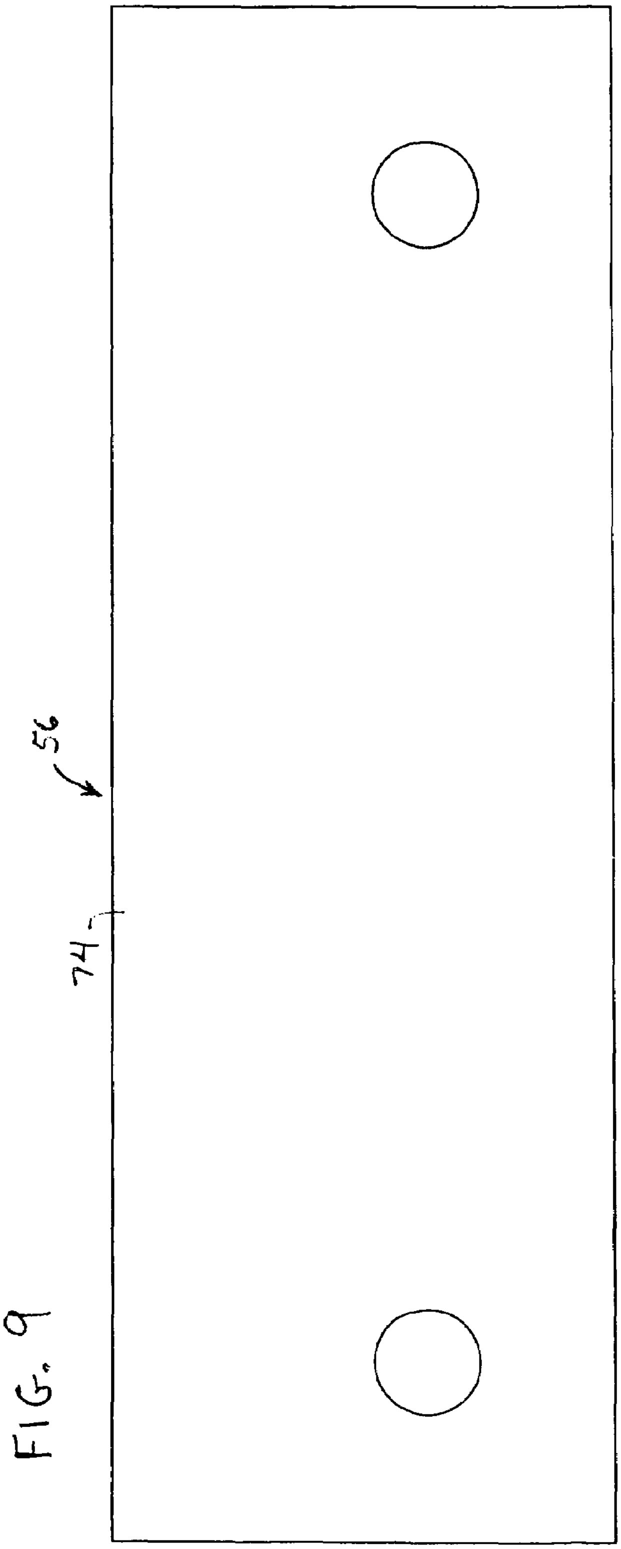
FIG. 9 shows a top view of a representative shim member that can be employed as a first and/or second spacing mechanism.
Figure 9A:
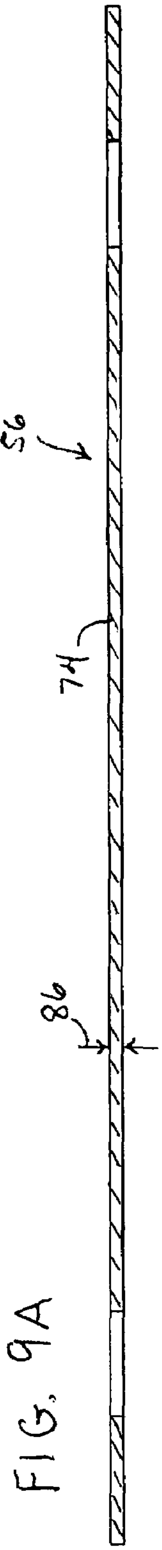
FIG. 9A shows a representative cross-section of the shim member that is illustrated in FIG. 9.
Figure 12:
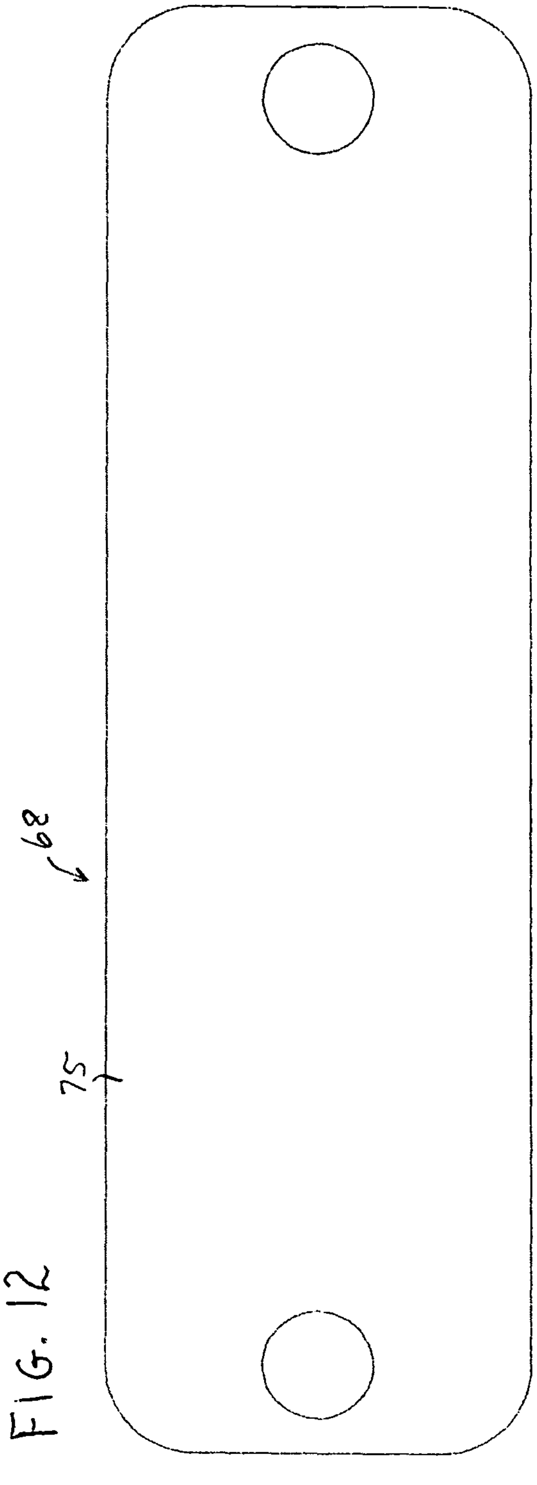
FIG. 12 shows a top view of a representative shim member that can be employed as a third spacing mechanism.
Figure 12A:
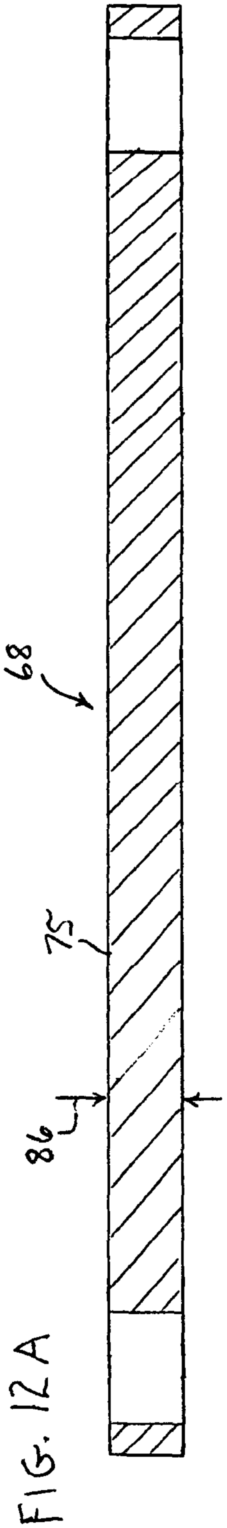
FIG. 12A shows a representative cross-section of the shim member that is illustrated in FIG. 12.

The thickness dimension 86 of each shim 74 (e.g. FIGS. 9 and 9A) can be appropriately selected to provide a desired height difference 94 (e.g. FIG. 5) between a radially outboard embossing surface of the base-section 40 and a radially outboard embossing surface of the first supplemental-section 42 of the embossing-component 48. Similarly, the thicknesses of another corresponding system of shims 74 can be appropriately selected to provide a desired height difference 96 between a radially outboard embossing surface of the base-section 40 and a radially outboard embossing surface of the second supplemental-section 44 of the embossing-component 48. In particular arrangements, for example, the shim thickness 86 can be within a range of about 0.001–0.02 inch (about 0.025–0.51 mm). A desired configuration can employ a shim thickness of about 0.006 inch (about 0.152 mm). Individual shims may be stacked to provide a desired height difference. In a like manner, the thickness dimension 86 of each shim 75 (e.g. FIGS. 12 and 12A) can be appropriately selected to provide a desired height difference 98 (e.g. FIG. 5) between a radially outboard embossing surface of the base-section 40 and a radially outboard embossing surface of the third supplemental-section 66 of the selected embossing-component.

In a particular aspect, the height difference 94 and/or 96 can be at least a minimum of about 0.08 mm. The height difference can alternatively be at least about 0.1 mm, and can alternatively be at least about 0.13 mm to provide improved performance. In another aspect, the height difference can be up to about 0.25 mm, or more. The height difference can alternatively be up to about 0.22 mm, and can optionally be up to about 0.18 mm to provide improved performance. If the height difference is outside the desired values, the target web can experience uneven embossing across its different regions. For example, the target web can contain embossed areas that are undesirable hard or stiff, and/or embossed regions that are poorly formed.

As representatively shown, the maximum, radially outboard extent of the base-section 40 can be less than the maximum, radially outboard extent of any or all of the supplemental-sections 42, 44, 66 of the selected embossing component. Optional arrangements can provide a maximum, radially outboard extent of the base-section 40 which is greater than the maximum, radially outboard extent of any or all of the supplemental-sections 42, 44, 66.

A first, supplemental attachment-mechanism 60 can secure the radial position of the first supplemental embossing-segment 52 on the shaft member 46. Additionally, a second supplemental attachment-mechanism 62 can secure the radial position of the second supplemental embossing-segment 54, and a third supplemental attachment-mechanism 70 can secure the radial position of the third supplemental embossing-segment 64. In the constructions of the various configurations of the invention, any operative attachment device or system may be employed. For example, the attachment mechanism can include a system of welds, a system of thermal bonds, an interengaging mechanical fastener system, an adhesive fastener, a cohesive fastener, a magnetic fastener, an electro-mechanical fastener, clamps, latches, pins, screws, threaded attachments, non-threaded attachments or the like, as well as combinations thereof. As representatively shown the attachment mechanism can include an operative system of threaded bolts.

Figure 7:
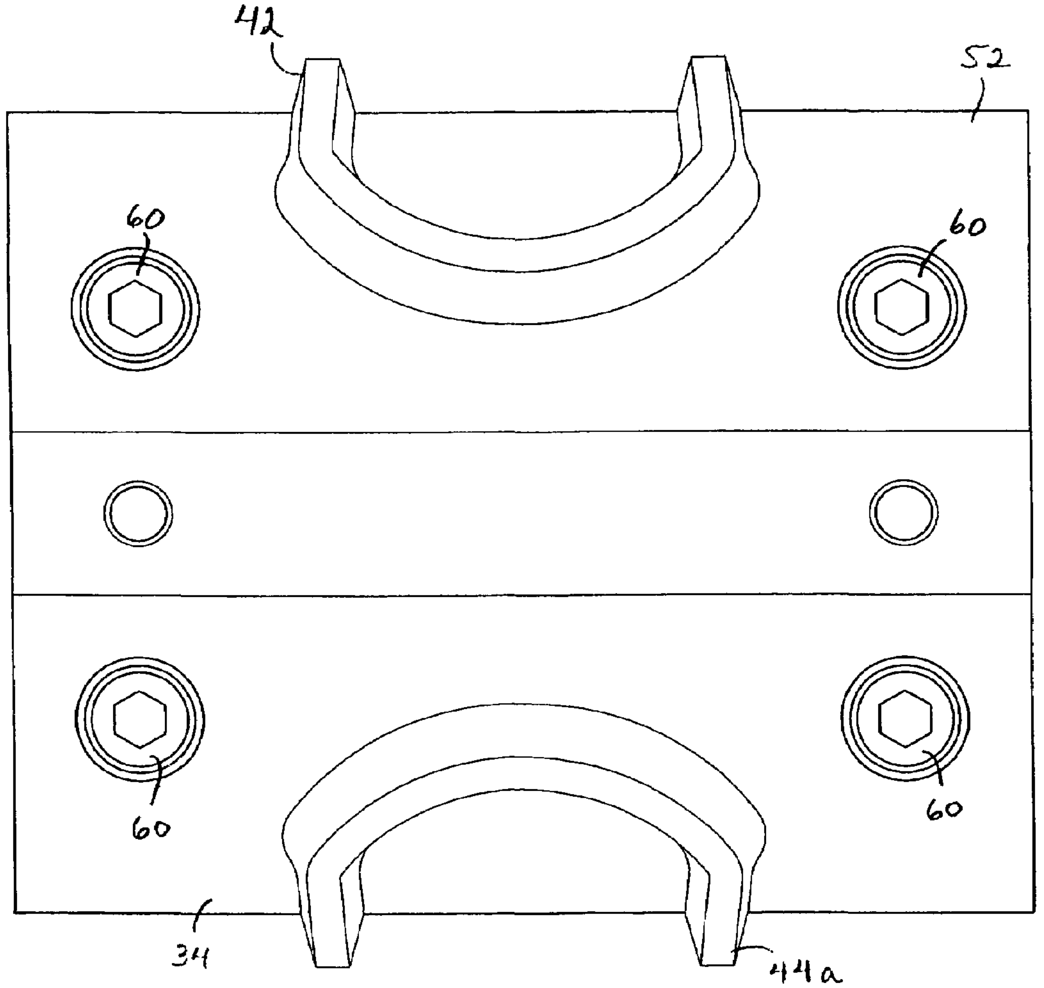
FIG. 7 shows a top view of a representative, first or second supplemental embossing-segment that can be employed with the rotary embossing device.
Figure 7A:
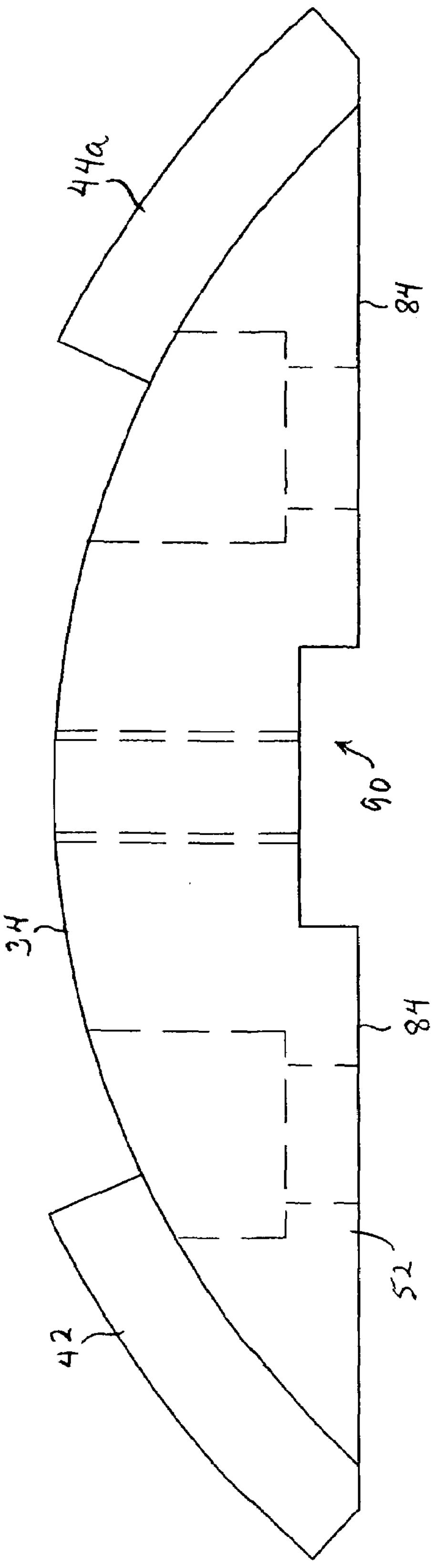
FIG. 7A shows a representative side view of the supplemental embossing-segment illustrated in FIG. 7.

With reference to FIGS. 6 through 8, for example, the rotary shaft member 46 can include suitable support regions for mounting the first and second supplemental embossing-segments 52 and 54. A particular configuration can include a rotary shaft member 46 which has at least one support slot 80 that is formed into the outer surface of the rotary shaft. As representatively shown, the support region can include a support surface 82 which provides a bottom floor of the support slot 80. The representatively shown support surface is substantially flat, but a non-flat support surface may optionally be employed. The support surface 82 is appropriately configured to operatively connect to an interior support surface 84 of a corresponding supplemental embossing-segment. Each support slot can be configured with a size and shape which operatively accommodates the placement of a corresponding, individual supplemental embossing-segment therein. Accordingly, the representatively shown arrangement of the embossing device 32 has a support slot 80 which accommodates the insertion of the first embossing-segment 52, and has another support slot which accommodates the insertion of the second embossing-segment 54.

In a particular feature, the support slot 80 can provide a cooperating keying member 88, which can operatively engage the embossing-segment 52 or 54 and help to maintain a desired positioning of the embossing-segment on the rotary shaft 46. The keying member can be located and operatively affixed to a corresponding support surface 82. Each supplemental embossing segment 52, 54 can include a keying slot 90 formed into the interior support surface 84 of the supplemental embossing-segment.

Either or both of the supplemental embossing-segments 52, 54 can be configured to provide an insert member which fits into the corresponding support that has been provided on the embossing device 32 (e.g. the support slot 80 that has been formed into the surface of the rotary embossing device). The individual supplemental embossing-segment can be operatively held and attached to the rotary shaft member 46 by employing any operative fastening mechanism such as provided by the illustrated system of bolts.

Where the spacing-mechanisms 56, 58 are provided by an operative system of individual shim members 74, each shim member 74 can be appropriately shaped and sized to fit into an individual support slot 80, and each shim member can be interposed between the floor or base surface 82 of the support slot, and the base surface 82 of the corresponding supplemental embossing-segment 52, 54. Each shim member has a thickness 86, and the shim thickness can be appropriately selected to provide the desired radial spacing of the supplemental embossing-segment away from the rotational axis 27 of the rotary embossing device 32. As representatively shown, a cooperating pair of shims 74 can be arranged to straddle the keying member 88. Optionally, a single shim member may be operatively configured to fit around the keying member.

In the various configurations of the method and apparatus 20, the first and/or second supplemental sections 42, 44 of the embossing-component 48 may be configured to be substantially contiguous with the base section 40 of the embossing component 48, (e.g. FIG. 3). Alternatively, the first and/or second supplemental sections 42, 44 may be configured to be substantially non-contiguous with the base section 40 of the embossing component 48. Additionally, the first and second supplemental sections 42 and 44 of the first embossing component 48 may be arranged to intersect and extend substantially continuously with respect to the base-section 40 of the first embossing-component or pattern (e.g. FIG. 3), at least along the circumferential direction 30 and axial direction 26. Optionally, the first and second supplemental sections 42 and 44 may be arranged to intersect and extend non-continuously with respect to the base-section of the first embossing-component or pattern. Accordingly, the various sections of the embossing-component 48 may or may not be separated apart by a significant distance along the axial and/or circumferential directions 26 and 30, respectively. The pattern sections of the embossing component may not intersect and may be offset from each other by a significant offset distance along the circumferential and/or axial directions.

Similarly, the first and second supplemental sections 43 and 45 of the embossing pattern 38 may or may not be substantially contiguous with the base section 41 of the embossing pattern 38 along the longitudinal and/or lateral directions 22 and 24, respectively, of the article. Accordingly, the various sections of the embossing pattern may or may not be offset or otherwise separated apart by a discrete distance along the longitudinal and/or lateral directions.

In the representatively shown configuration, the first supplemental-section 42 and the second supplemental-section 44 are appointed to be placed substantially immediately adjacent the first base-section 40 along the outer circumference of the rotary embossing device 32. Similarly, the first supplemental-section 42*a* and the second supplemental-section 44*a* are appointed to be positioned substantially immediately adjacent opposite ends of the base-section 40*a* of the first embossing component 48*a*.

In another aspect of the process and apparatus, the contacting of the target web 25 with the rotary embossing device 32 can be configured to provide a selected embossing force value. The embossing force value can be at least a minimum of about $3\times10^6$ Newtons per meter of cross-directional width of the embossing pattern (N/m), e.g. as found in the nip region between the rotary embossing device 32 and the rotary anvil 36. In a particular arrangement, the embossing force can be about 12,000 N (about 2,700 $lb_f$) applied to a 4 mm, total cross-directional length of embossing member contact with the target web that is provided in the embossing nip region. In another aspect, the embossing force value can be up to about $5\times10^7$ N/m in the nip region to provide improved performance. In a particular arrangement, the embossing force can be about $2\times10^5$ N (about 45,000 $lb_f$) applied to a 4 mm, total cross-directional length of embossing member contact with the target web that occurs in the embossing nip region. With reference to the embossing pattern illustrated in FIG. 2 that is produced with the embossing component illustrated in FIG. 6A, for example, the total cross-directional length ($L_T$) of the embossing member contact with the target web in the embossing nip region would be determined by the following calculation:

$$L_T=2^*(\text{Element Width } 48a)+2^*(\text{Element Width } 48b)$$

If the embossing force is too low, light embossing or under-embossing can occur when operating at high embossing speeds. If the embossing force is too high and/or the nip gap is too small, the embossed areas may be too stiff and the apparatus and process may experience upsets due to jams within the embossing system.

With reference again to FIG. 1, the apparatus and process can further include an attaching of the composite web 25 to a layer of baffle material 37. In a particular aspect, the attaching of the baffle layer can occur after the occurrence of the contacting of the composite web 25 with the rotary embossing device 32.

The backsheet or baffle layer web 37 may include a layer constructed of any operative material, and may or may not have a selected level of liquid-permeability or liquid-impermeability, as desired. In a particular configuration, the backsheet or baffle layer web 37 may be configured to provide an operatively liquid-impermeable baffle structure. The baffle may, for example, include a polymeric film, a woven fabric, a nonwoven fabric or the like, as well as combinations or composites thereof. For example, the baffle may include a polymer film laminated to a woven or nonwoven fabric. In a particular feature, the polymer film can be composed of polyethylene, polypropylene, polyester or the like, as well as combinations thereof. Additionally, the polymer film may be micro-embossed. Desirably, the baffle layer web 37 can operatively permit a sufficient passage of air and moisture vapor out of the article, particularly out of an absorbent (e.g. storage or absorbent structure 31) while blocking the passage of bodily liquids. An example of a suitable baffle material can include a breathable, microporous film, such as a HANJIN Breathable Baffle available from Hanjin Printing, Hanjin P&C Company Limited, a business having offices located in Sahvon-li.Jungan-mvu.Kongiu-City, Chung cheong nam-do, Republic of South Korea. The baffle material is a breathable film, which is dimple embossed and contains: 47.78% calcium carbonate, 2.22% $TiO_2$, and 50% polyethylene.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

What is claimed is:

1. An embossing apparatus, comprising a rotary embossing device having an axis of rotation, an axial direction, a radial direction, a circumferential direction, and an outer peripheral surface, said embossing device including:

at least a first embossing-component which extends at least radially outward from said peripheral surface and is configured to provide for a first embossing-pattern;

a rotary shaft member;

at least a first, base embossing-segment which is operatively joined to said rotary shaft member and is configured to carry a first base-section of said first embossing-component;

a first, supplemental embossing-segment which is operatively joined to be selectively positionable on said rotary shaft member, and is configured to carry a first supplemental-section of said first embossing-component;

a first, spacing-mechanism for adjusting a radial position of said first, supplemental embossing-segment;

a first, supplemental attachment-mechanism which secures the radial position of said first supplemental embossing-segment.

2. An embossing apparatus as recited in claim 1, wherein said embossing device further includes a second, supplemental embossing-segment which is operatively joined to be selectively positionable on said rotary shaft member, and is configured to carry a second supplemental-section of said first embossing-component;

a second, spacing-mechanism for adjusting a radial position of said second, supplemental embossing-segment on said rotary shaft member; and a second, supplemental attachment-mechanism which secures the radial position of said second, supplemental embossing-segment.

3. An embossing apparatus, comprising a rotary embossing device having an axis of rotation, an axial direction, a radial direction, a circumferential direction, and an outer peripheral surface, said embossing device including:

at least a first embossing-component which extends at least radially outward from said peripheral surface and is configured to provide for a first embossing-pattern;

a rotary shaft member;

at least a first, base embossing-segment which is operatively joined to said rotary shaft member and is configured to carry a first base-section of said first embossing-component;

a first, supplemental embossing-segment which is operatively joined to be selectively positionable on said rotary shaft member, and is configured to carry a first supplemental-section of said first embossing-component;

a first, spacing mechanism for adjusting a radial position of said first supplemental embossing-segment;

a first, supplemental attachment mechanism which secures the radial position of said first supplemental embossing-segment;

a second, supplemental embossing-segment which is operatively joined to be selectively positionable on said rotary shaft member, and is configured to carry a second supplemental-section of said first embossing-component;

a second, spacing mechanism for adjusting a radial position of said second supplemental embossing-segment;

a second, supplemental attachment mechanism which secures the radial position of said second supplemental embossing-segment;

at least a third supplemental embossing-segment which is operatively joined to said rotary shaft member and is configured to provide for a second embossing-pattern; and a third spacing mechanism for adjusting a radial position of said third supplemental embossing-segment on said rotary shaft member.

4. An apparatus as recited in claim 1, further comprising a cooperating rotary anvil which is located operatively adjacent said rotary embossing device.

5. An apparatus as recited in claim 1, wherein said first spacing mechanism includes at least one separately provided shim member which is located between said rotary shaft member and said first supplemental embossing-segment.

6. An apparatus as recited in claim 1, wherein embossing-component has a back-and-forth configuration located along at least the base-section of said first embossing-component, the back-and-forth configuration having a traversing frequency which is at least a minimum of about 1 cycle arranged to occur with a 5 cm, circumferential length section of said first embossing-component.

7. An apparatus as recited in claim 6, wherein said back-and-forth configuration includes a lateral traversing distance which is at least a minimum of about 0.1 cm.

8. An apparatus as recited in claim 1, further comprising a cooperating rotary, patterned anvil which is located operatively adjacent said rotary embossing device;

wherein said rotary anvil has an outer peripheral anvil surface; and said anvil surface includes an anvil pattern which cooperatively matches said embossing pattern.

9. An embossing process, comprising: rotating a rotary embossing device having an axis of rotation, an axial direction, a radial direction, a circumferential direction, an outer peripheral surface, and a first embossing-component which has been configured to extend radially outward from said peripheral surface to provide for a first embossing-pattern;

wherein said rotary embossing device has included a rotary shaft member, at least a first, base embossing-segment which is operatively joined to said rotary shaft member, and a first, supplemental embossing-segment which is joined to said rotary shaft member and is selectively positionable on said rotary shaft member;

a radial position of said first, supplemental embossing-segment on said rotary shaft member has been adjusted with a first spacing mechanism; and the radial position of said first, supplemental embossing-segment has been secured with a first, supplemental attachment-mechanism.

10. An embossing process as recited in claim 9, wherein said rotary embossing device has further included a second, supplemental embossing-segment which is joined to said rotary shaft member and is selectively positionable on said rotary shaft member;

a radial position of said second, supplemental embossing-segment on said rotary shaft member has been adjusted with a second spacing mechanism; and the radial position of said second, supplemental embossing-segment has been secured with a second, supplemental attachment-mechanism.

11. An embossing process, comprising: rotating a rotary embossing device having an axis of rotation, an axial direction, a radial direction, a circumferential direction, an outer peripheral surface, and a first embossing-component which has been configured to extend radially outward from said peripheral surface to provide for a first embossing-pattern;

wherein said rotary embossing device has included a rotary shaft member, at least a first, base embossing-segment which has been operatively joined to said rotary shaft member, a first, supplemental embossing-segment which has been joined to said rotary shaft member and has been selectively positioned on said rotary shaft member, a second, supplemental embossing-segment which has been joined to said rotary shaft member and has been selectively positioned on said rotary shaft member, and at least a third supplemental embossing-segment which has been operatively joined to said rotary shaft member;

a radial position of said first, supplemental embossing-segment on said rotary shaft member has been adjusted with a first segment-spacing mechanism;

the radial position of said first, supplemental embossing-segment has been secured with a first, supplemental attachment-mechanism;

a radial position of said second supplemental embossing-segment on said rotary shaft member has been adjusted with a second segment-spacing mechanism; and a radial position of said third supplemental embossing-segment has been adjusted with a corresponding third segment-spacing mechanism.

12. An embossing process as recited in claim 11, wherein the radial position of said second, supplemental embossing-segment has been secured with a second, supplemental attachment-mechanism; and the radial position of said third, supplemental embossing-segment has been secured with a third, supplemental attachment-mechanism.

13. An embossing process as recited in claim 11, further including cooperatively rotating a rotary anvil which has been located operatively adjacent said rotary embossing device.

14. An embossing process as recited in claim 11, wherein said first spacing mechanism has included at least one separately provided shim member which has been located between said rotary shaft member and said first supplemental embossing-segment.

15. An embossing process as recited in claim 11, wherein said first and second supplemental-sections of the first embossing-component are arranged to intersect and extend substantially continuously with respect to said base-section of the first embossing-component.

16. An embossing process as recited in claim 11, wherein said first and second supplemental-sections of the first embossing-component are arranged to intersect and extend non-continuously with respect to said base-section of the first embossing-component.

17. An embossing process as recited in claim 11, wherein said rotary shaft member includes a first support slot configured with a size and shape which operatively accommodates a placement of said first supplemental embossing-segment therein.

18. An embossing process as recited in claim 17, wherein said rotary shaft member has included a second support slot configured with a size and shape which operatively accommodates the placement of said second supplemental embossing-segment therein.

19. An embossing process as recited in claim 18, wherein said rotary shaft member has included an operative support mechanism which is appropriately configured to hold and carry said third supplemental embossing-segment.

20. An embossing process as recited in claim 18, wherein said rotary shaft member has included a socket region that is appropriately sized and shaped to operatively accommodate the placement of said third supplemental embossing-segment into said socket region.

* * * * *

UNITED STATES PATENT AND TRADEMARK OFFICE

CERTIFICATE OF CORRECTION

PATENT NO. : 6,998,086 B2
APPLICATION NO. : 10/666367
DATED : February 14, 2006
INVENTOR(S) : Jesse J. Pasterski et al.

It is certified that error appears in the above-identified patent and that said Letters Patent is hereby corrected as shown below:

Title Page, Item (75) Inventors: After

"Rodney Lawrence Abba, Oshkosh, WI (US)"

Insert

-- Yung-Kun Chen, Hsichih Hsiang (Taiwan, Republic of China) --

Signed and Sealed this

Seventeenth Day of April, 2007

JON W. DUDAS

*Director of the United States Patent and Trademark Office*